(12) United States Patent
Li et al.

(10) Patent No.: US 11,683,554 B2
(45) Date of Patent: Jun. 20, 2023

(54) TECHNIQUES FOR MANAGING GENERATION AND RENDERING OF USER INTERFACES ON CLIENT DEVICES

(71) Applicant: NAGRAVISION S.A., Cheseaux-sur-Lausanne (CH)

(72) Inventors: Hongliang Li, Beijing (CN); Alain Delpuch, Paris (FR)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 0 days.

(21) Appl. No.: 17/294,889

(22) PCT Filed: Nov. 21, 2019

(86) PCT No.: PCT/IB2019/060046
§ 371 (c)(1),
(2) Date: May 18, 2021

(87) PCT Pub. No.: WO2020/104999
PCT Pub. Date: May 28, 2020

(65) Prior Publication Data
US 2021/0409810 A1 Dec. 30, 2021

Related U.S. Application Data

(60) Provisional application No. 62/770,973, filed on Nov. 23, 2018.

(51) Int. Cl.
*H04N 21/431* (2011.01)
*H04N 21/482* (2011.01)
*G06F 9/451* (2018.01)

(52) U.S. Cl.
CPC ......... *H04N 21/4312* (2013.01); *G06F 9/451* (2018.02); *H04N 21/4821* (2013.01); *H04N 21/4825* (2013.01)

(58) Field of Classification Search
CPC .......... H04N 21/4312; H04N 21/4821; H04N 21/4825; G06F 9/451
USPC ....................................................... 725/39
See application file for complete search history.

(56) References Cited

U.S. PATENT DOCUMENTS

| | | | |
|---|---|---|---|
| 11,036,344 B1 * | 6/2021 | Portelli | G06F 3/0481 |
| 11,196,748 B1 * | 12/2021 | Croney | H04L 61/1511 |
| 2011/0067059 A1 * | 3/2011 | Johnston | H04N 21/6181 715/810 |
| 2018/0115790 A1 * | 4/2018 | Kim | H04N 21/47217 |
| 2018/0364890 A1 * | 12/2018 | Lee | G06F 3/04817 |
| 2018/0365200 A1 * | 12/2018 | Guo | G06F 40/143 |

\* cited by examiner

*Primary Examiner* — Dominic D Saltarelli
(74) *Attorney, Agent, or Firm* — Polsinelli LLP

(57) ABSTRACT

Techniques and systems are provided for processing user interface content. For example, a server computer can receive a user interface event corresponding to a user interface of a device (e.g., a client device, another server computer, or other device). An application associated with the user interface event can be determined, and an interface model 5 can be generated using the application associated with the user interface event. The interface model defines state information for one or more graphic objects of the user interface. The state information results from the user interface event. The server computer can send the interface model to the device, which enables the device to render the user interface.

22 Claims, 11 Drawing Sheets

900

RECEIVE, BY A SERVER COMPUTER, A USER INTERFACE EVENT, THE USER INTERFACE EVENT CORRESPONDING TO A USER INTERFACE OF A CLIENT DEVICE
902

DETERMINE AN APPLICATION ASSOCIATED WITH THE USER INTERFACE EVENT
904

GENERATE AN INTERFACE MODEL USING THE APPLICATION ASSOCIATED WITH THE USER INTERFACE EVENT, WHEREIN THE INTERFACE MODEL DEFINES STATE INFORMATION FOR ONE OR MORE GRAPHIC OBJECTS OF THE USER INTERFACE, THE STATE INFORMATION RESULTING FROM THE USER INTERFACE EVENT
906

SEND, BY THE SERVER COMPUTER, THE INTERFACE MODEL TO THE CLIENT DEVICE, THE INTERFACE MODEL ENABLING THE CLIENT DEVICE TO RENDER THE USER INTERFACE
908

TECHNIQUES FOR MANAGING GENERATION AND RENDERING OF USER INTERFACES ON CLIENT DEVICES

CROSS-REFERENCES TO RELATED APPLICATIONS

This application is a U.S. National Stage of PCT Application No. PCT/IB2019/060046, filed Nov. 21, 2019, which claims the priority benefit of U.S. Provisional Patent Application No. 62/770,973, filed on Nov. 23, 2018, all of which are incorporated herein by reference in their entirety for all purposes.

FIELD

The present disclosure generally relates to techniques and systems for managing the generation and rendering of user interfaces, and more specifically to improving the efficiency for generating and rendering user interfaces using a server-based system.

BRIEF SUMMARY

In some examples, techniques and systems are described herein for implementing a user interface, for which generation and rendering is managed by a centralized, or server-based computer system (e.g., a cloud-based server system, a distributed computer system, or other remote computer-based system) that is remote from a client device. The server-based system can implement techniques to manage user interfaces across multiple devices, thereby improving the efficiency by which a common user interface is managed across systems with many client devices. The user interfaces can include any suitable type of physical or virtual user interface capable of facilitating receipt of input via an input device, such as any type of graphical user interface (GUI), an electronic programming guide (EPG) or content guide for accessing media content, a user interface for a gaming application, and/or any other suitable type of user interface. In some cases, a user interface can be generated for each application on a client device. For example, a client device can display a first user interface for a first application, a second user interface for a second application, a third user interface for a third application, and so on.

The server-based user interface can be implemented and/or managed partly by a server system and partly by a client device, or combinations thereof, for rendering the user interface. For example, the server system can determine graphical elements (also referred to as graphic objects) to display, where and how to display the different graphical elements, how to react to user interface events (also referred to as interface events), among other user interface actions. The client device can relay interface events to the server system and can render the graphics for the user interface based on user interface layout information and other attributes associated with the user interface (e.g., an interface model, as described herein) received from the server system. The server system can include one or more server computers. In some examples, the server system can include a cloud-based computer system. The client device can include any suitable device, such as a media device (e.g., a set-top box or other console device), an Internet-connected television, a mobile device (e.g., cellular telephone, laptop, tablet computer, wearable device, or other mobile device). The client device can be connected to the server computer system using a wired or wireless network.

The client device can send interface events to the server system for processing. The interface events can be generated by the client device based on user input received through the user interface (e.g., an event specific to the application to which the user interface applies), based on system-level events (e.g., an event related to a user interface at the client device, such as a volume adjustment or a change in a dynamic interface), and/or based on application-level events. The server system can identify an application and/or system (e.g., for system-level events) to which a received user interface event applies, and can determine any changes in the user interface for that application and/or system based on the received interface event.

In some examples, the server system can generate a user interface model (also referred to herein as an interface model) describing how the user interface should look at any moment. For instance, an interface model can be generated based on received user interface events, such as one or more key presses, finger movements, device orientations and/or positions, among others. In some cases, an interface model can be based on other events, such as other remote client events or events received from a device or system other than a client device. For example, other events can be based on video being started or ending, video access control being denied, a phone ringing, an email or other message being received, among other events. In some cases, the server system can generate an interface model defining state information for one or more graphic objects of the user interface (e.g., a user interface layout and/or other attributes of the one or more graphic objects). In some implementations, the interface model can be defined, wholly or partially, by a structure or syntax, which can define or represent the logical structure of a document (e.g., a structure of a user interface of an application), and the way the document is accessed, generated, rendered, and/or manipulated. For example, an interface model may include a Document Object Model (DOM) that defines the structure for presenting components that comprise a user interface.

In some cases, the server system can improve the efficiency by which a user interface is generated and rendered at a client device. In at least one embodiment, the server system can optimize the interface model before sending the interface model to the client device. For example, the server system can determine a difference between a current user interface (e.g., current state information of the user interface, such as a current user interface, current attributes of graphic elements, among other state information) and a prior user interface (e.g., prior state information generated prior to the current state information of the current user interface), and can generate an intermediate interface model (also referred to herein as "a delta interface model") indicating the difference, or delta, between the current user interface and the prior user interface. The server system can send a delta interface model to the client device indicating the difference only, instead of the entire interface model that describes state information for the entire user interface.

The interface model, or a delta interface model, can be sent from the server system to the client device. A graphics rendering engine of the client device can render the user interface based on the received interface model. For example, the client device can read an interface model received for a given user interface, and can render the interface defined by the interface model. The client device can update the user interface based on the delta indicating the properties and/or functions of the user interface that have changed. In some cases, the interface model can indicate properties and/or functions of the user interface that can be reused if the user interface changes by a certain amount (e.g., a complete change in the user interface). Use of the interface model enables the client device to avoid processing to determine state information for a user interface (e.g., a layout among other attributes) or changes in state information, such as performing layout computation. For example, the server system can pre-compute the graphical element properties (e.g., the graphical element positions, sizes, colors, and/or other properties), which are represented by the interface model, so that there no need for the client device to determine user interface state information (e.g., perform a layout computation, graphic attribute computation, etc.), among other processing required to determine the user interface properties. Instead, the interface model is communicated to the client device, and the client device can implement routines (e.g., graphic routines) to generate the user interface based on the interface model. For example, using the interface model, the client can convert a tree of graphic objects from the interface model to a list of graphic routine calls.

According to at least one example, a method of processing user interface content is provided. The method includes receiving, by a server computer, a user interface event. The user interface event corresponds to a user interface of a client device. The method further includes determining an application associated with the user interface event and generating an interface model using the application associated with the user interface event. The interface model defines state information for one or more graphic objects of the user interface. The state information results from the user interface event. The method further includes sending, by the server computer, the interface model to the client device. The interface model enables the client device to render the user interface.

In another example, a system is provided for processing user interface content. The system includes one or more processors and a memory accessible to the one or more processors and storing instructions which, upon execution by the one or more processors, causes the one or more processors to: receive a user interface event, the user interface event corresponding to a user interface of a client device; determining an application associated with the user interface event; generating an interface model using the application associated with the user interface event, wherein the interface model defines state information for one or more graphic objects of the user interface, the state information resulting from the user interface event; and sending the interface model to the client device, the interface model enabling the client device to render the user interface.

In another example, a non-transitory computer-readable medium of a server computer having stored thereon instructions that, when executed by one or more processors, cause the one or more processor to: receive a user interface event, the user interface event corresponding to a user interface of a client device; determining an application associated with the user interface event; generating an interface model using the application associated with the user interface event, wherein the interface model defines state information for one or more graphic objects of the user interface, the state information resulting from the user interface event; and sending the interface model to the client device, the interface model enabling the client device to render the user interface.

In some aspects, the methods, apparatuses, and computer-readable medium described above can further comprise compressing the interface model. The interface model sent to the client device is the compressed interface model.

In some aspects, the interface model is a first interface model and compressing the interface model includes: determining a difference between the state information for the one or more graphic objects and previous state information for the one or more graphic objects; and generating a second interface model including data for the one or more graphic objects having state information that is different from the previous state information.

In some cases, generating the interface model includes generating a portion of the interface model. The portion of the interface model is associated with a portion of the user interface.

In some aspects, the methods, apparatuses, and computer-readable medium described above can further comprise: determining an application is triggered by the client device; determining the application is not running on the server computer; and adding the application to a list of applications accessible by a plurality of client devices using the server computer.

According to at least one other example, a method of processing user interface content is provided. The method includes receiving, by a server computer, a user interface event. The user interface event corresponds to a user interface of a client device. The method further includes determining an application associated with the user interface event and generating an interface model using the application associated with the user interface event. The interface model defines state information for one or more graphic objects of the user interface. The state information results from the user interface event. The method further includes determining a difference between the state information for the one or more graphic objects and previous state information for the one or more graphic objects. The method further includes generating a second model including data for the one or more graphic objects having state information that is different from the previous state information. The method further includes sending, by the server computer, the second interface model to the client device. The second interface model enables the client device to render the user interface.

In another example, a system is provided for processing user interface content. The system includes one or more processors and a memory accessible to the one or more processors and storing instructions which, upon execution by the one or more processors, causes the one or more processors to: receive a user interface event, the user interface event corresponding to a user interface of a client device; determine an application associated with the user interface event; generate an interface model using the application associated with the user interface event, wherein the interface model defines state information for one or more graphic objects of the user interface, the state information resulting from the user interface event; determine a difference between the state information for the one or more graphic objects and previous state information for the one or more graphic objects; generate a second model including data for the one or more graphic objects having state information that is different from the previous state information; and send the second interface model to the client device, the second interface model enabling the client device to render the user interface.

In another example, a non-transitory computer-readable medium of a server computer having stored thereon instructions that, when executed by one or more processors, cause the one or more processor to: receive a user interface event, the user interface event corresponding to a user interface of a client device; determine an application associated with the user interface event; generate an interface model using the application associated with the user interface event, wherein the interface model defines state information for one or more graphic objects of the user interface, the state information resulting from the user interface event; determine a difference between the state information for the one or more graphic objects and previous state information for the one or more graphic objects; generate a second model including data for the one or more graphic objects having state information that is different from the previous state information; and send the second interface model to the client device, the second interface model enabling the client device to render the user interface.

In some aspects of any of the above examples, the interface model (and/or second interface model) includes a hierarchical data structure having the one or more graphic objects. Each graphic object of the one or more graphic objects can have one or more attributes defined by the state information. In some aspects, the one or more graphic objects include at least one of a box, a line, an image, an icon, text, and a content item to be displayed in the user interface. In some aspects, each graphic object of the one or more graphic objects includes one or more attributes defined by the state information. The one or more attributes of the one or more graphic objects can include at least one of a position, a shape, and a color of a graphic object.

In some aspects of any of the above examples, the methods, apparatuses, and computer-readable medium described above can further comprise determining the state information based on at least the user interface event.

In some aspects of any of the above examples, the application associated with the user interface event is determined based on a connection between the server computer and the client device.

In some aspects of any of the above examples, the client device includes a media device, and wherein the user interface includes a media content guide.

The examples disclosed herein with respect to the example methods, apparatuses, and computer-readable medium can be implemented individually or in any combination.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 9 is a flowchart illustrating an example of a process of processing user interface content, in accordance with some embodiments;

DETAILED DESCRIPTION

Figure 1:
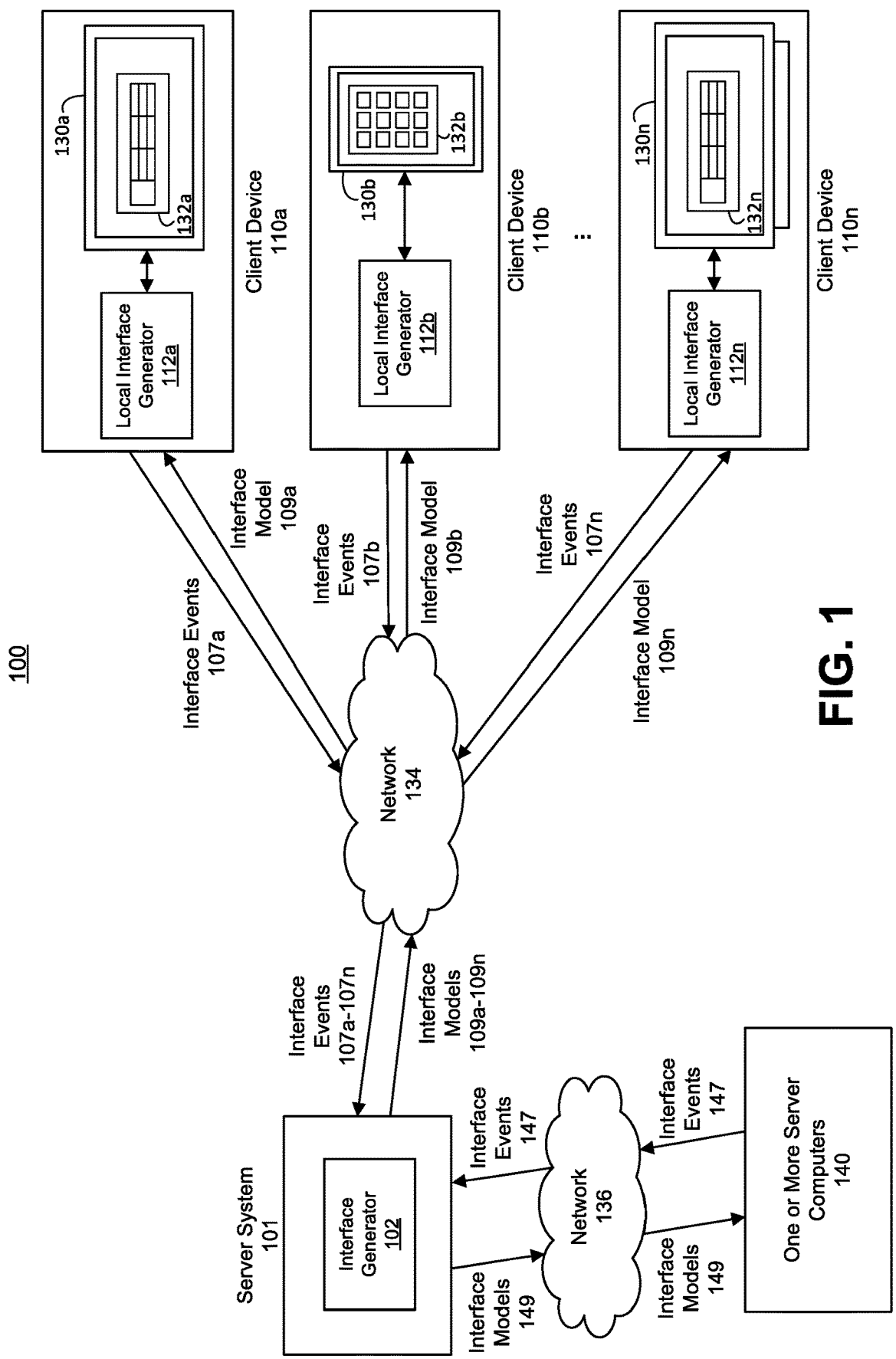
FIG. 1 is a block diagram illustrating an example of a network environment, in accordance with some embodiments.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

A user interface can be displayed by a device and can allow a user to interact with the device and/or a software application (also referred to herein as an application) executed by the device by interacting with graphical elements of the user interface. For example, a user can provide input to manipulate, control, select, and/or interact with different graphical elements of the user interface through one or more inputs provided via a device capable of receiving input from the user. Inputs may include, for example, touch inputs, gesture inputs, device-assisted inputs, and/or voice inputs, among others. User interfaces can be used for various purposes. For example, a user can obtain a service or item (e.g., obtain a news article, order a movie or show by interacting with an application, order food by interacting with an application, among others) using a user interface. In another example, a user can interact with a game by interacting with a user interface of a gaming application.

In some cases, user interfaces can be generated, rendered, or a combination thereof, on a client device. A client device can include any device connected to a wired and/or wireless network, such as a set-top box, an Internet-connected television, a mobile device (e.g., cellular telephone, laptop, tablet, or other mobile device), a desktop computer, a wearable device (e.g., a smart watch, a fitness tracker, a virtual reality headset, an augmented reality headset, or other wearable device), or other device. For example, a client device-implemented user interface solution can be implemented by running client user interface code on the client device (e.g., as a native application or using HTML/JavaScript), where the user interface code generates and renders a user interface. In such an implementation, the client user interface code needs to perform layout computations and other computations for the user interface, requiring the client device to process all user interface events and to determine user interface layouts and other user interface attributes (e.g., color of graphic objects, edge information for graphic objects, speed of a video to be played in a user interface, among others) based on the events. In some cases, the client device can interact with a back-end server for processing data and for database access (e.g., for programming data, video-on-demand data, etc.).

However, in some cases, such a client-device implementation can lead to user interfaces with poor performance characteristics. In some examples, the poor performance can be due to the communication of the client device with the server for information and/or content. For instance, there can be delays at startup of the user interface and/or during deployment of the user interface. In one example, it generally can take a large amount of time to start (e.g., load, compile JavaScript, among other tasks) the user interface code itself. In another example, it can also take a large amount of time for the user interface code to become ready for use. In some cases, the user interface code may also need to prefetch a large amount of data (e.g., in order for the application to be faster when in use).

Another problem with existing user interface solutions is bandwidth utilization. For example, existing solutions require a large amount of bandwidth for user interface management, which is costly with respect to network resources, and even more so in systems having many users. In one illustrative example, the loading time of an application depends on bandwidth, which can be limited when slow networks are used (e.g., an Asymmetric Digital Subscriber Line (ADSL) network, a 3G network, or other network). Bandwidth delay leads to reduced performance for generation and/or rendering of user interfaces. Bandwidth can be costly due to the cost required when paid by the amount used (e.g., a certain dollar amount per Gigabyte). In some cases, to compensate for the bandwidth cost, one solution is to use more memory to better cache code and data, which can also be an expensive solution. The techniques described herein can reduce required bandwidth. Such reduction in the communication for scale will improve the efficiency by which user interfaces are managed, thereby improving run-time and reducing the resources needed to manage user interfaces.

Such issues can be further exacerbated by systems with many client devices, where each client device is managing its own interface and has to maintain communication with the server for application-related data, among other information. The issues can become even more problematic when user interfaces change rapidly, requiring many updates and frequent communications with one or more servers.

Other issues can also arise from a client-device based user interface implementation. For example, more computing resources may be needed to develop a feature on multiple client devices than needed to develop a feature on a server system. For example, various client devices (e.g., set-top boxes, smart televisions, mobile devices, etc.) may not have the ability to share resources among each other. In one illustrative example, if a media content provider needs 1 Gigabyte of storage per client device, and there are one million users (and thus at least one million client devices), the amount of required storage would be at least one petabyte. Further, different device limitations, platforms, versions of supported code, versions of user interfaces, among other factors, make it difficult to manage user interfaces on the client side.

In some cases, user interfaces can be implemented by one or more server computers (also referred to herein as servers). For example, a cloud-based system can include one or more server computers that generate and render a user interface, which is then sent to a client device. For media-based applications (e.g., television applications, streaming media applications, streaming gaming applications, among others), the user interface can be sent along with or separate from a content stream (e.g., a media stream). The cloud-based system can implement the full user interface, including the logic, graphic renderings, video conversion, etc. Such a solution can allow there to be less software installed on the client device (also requiring less software upgrades), and can require less testing, which helps with time to market. However, moving user interface processing (e.g., view, controller, etc.) into a cloud-based system can be challenging for various reasons. For example, for each active client device, a server computer may need to have memory for its graphics, processing power to render the graphics, and processing power to compress the graphics (e.g., for compressing video, images, and/or any other graphics compression schema). Such a solution can be approximately 50-100 times more hardware intensive than the actual application 'logic' code itself. Such a solution can also use a large amount of bandwidth from the one or more server computers. Further, it can be desirable to keep user interaction close to real-time (e.g., the display follows user input in less than 20 milliseconds (ms), 50 ms, 100 ms, or other minimal time duration), which is difficult with a cloud-based system. A cloud-based system can also be hard to achieve (especially in real-time), and even harder to scale to larger deployments, without using a large amount of central processing unit (CPU) and bandwidth resources to perform the desired functions (e.g., manage interactive events through a user interface). The amount of CPU and bandwidth required to implement such a system (even more-so in real-time) can be prohibitively expensive. It can also be difficult on the server side to periodically send multiple different user interfaces and user interface changes.

Systems, methods, and computer-readable media are described herein for implementing a user interface, for which generation and rendering is managed by a centralized, or server-based computer system (e.g., a cloud-based server system, a distributed computer system, or other remote computer-based system) that includes one or more server computers and is remote from a client device. The server-based system can implement techniques to manage user interfaces across multiple devices, thereby improving the efficiency by which a common user interface is managed across systems with many client devices. The server-based user interface described herein can be implemented and/or managed partly by a server system (including one or more server computers) and partly by a client device, or combinations thereof, for rendering the user interface. For example, a client device can generate user interface events (e.g., based on user input received through the user interface, based on system-level events, and/or based on application-level events) and can send the interface events to the server system. The server system can identify an application and/or system (e.g., for system-level events) to which an interface event is to be applied, and can determine state information for the user interface (e.g., perform the layout implementation necessary to determine the layout of the user interface, determining other features of graphic objects of the interface, etc.) that results from any applicable interface events. The layout implementation may include layout computation, among other functions. In some cases, the server system can generate an interface model that structurally defines state information of the user interface, and can send the interface model (or a compressed version of the interface model) to the client device. The client device can then read the interface model and can render the interface defined by the interface model.

The state information of the user interface can include state information for one or more objects (e.g., graphic objects and any other objects) of the user interface. The state information can define the layout of graphic objects (e.g., position, orientation, etc. of each graphic object) in the user interface and attributes or properties of the graphic objects (e.g., color, font, image, video used, etc.). Attributes or properties can also be used to change the state of an object. In one illustrative example using a video object as an example of a graphic object, a 'speed' attribute or property in the object model can control the playback speed of a video (e.g., a value of 1 is normal, 0 is pause, etc.). In another example, an 'onSpeedChange' property in the object model can indicate to the client device that the server system is interested in video events, such as video started, video ended, video failed, among others.

The user interface generated using the server-based system described herein can include any suitable type of physical or virtual user interface capable of facilitating receipt of input via an input device. Illustrative examples of user interfaces include any type of graphical user interface (GUI), an electronic programming guide (EPG) or content guide for accessing media content, a user interface for a gaming application, a user interface for a banking application, and/or any other suitable type of user interface. In some cases, a client device can have stored thereon multiple applications. Each of the applications can have a separate user interface that allows a user to interact with the application. For example, a smart television or set-top box can include a first application for a first streaming service, a second application for a second streaming service, and a third application that allows a user to mirror content displayed on a mobile device to the television. In such an example, the first application can have a first user interface, the second application can have a second user interface, and the third application can have a third user interface.

The server-based user interface system described herein can be used in any type of system that includes a first device (e.g., acting as a server computer) and a second device (e.g., a client device), such as a client-server system, where the first device generates and/or manages an interface model and communicates (e.g., sends or transmits) the interface model (or a compressed version of the interface model) or provides access to the interface model or compressed version of the interface model (e.g., by sending a link referencing a location from which the interface model can be accessed) to the second device so that the second device can present (e.g., by rendering and/or displaying) a user interface defined by the interface model. Examples of systems for which the server-based user interface can be implemented include media systems where a content provider provides a content guide (e.g., an electronic programming guide and/or other user interface for interacting with media content, such as video content (video on demand content, streaming video content, and/or other video content), audio content (audio on demand content, streaming audio content, and/or other audio content), augmented reality content, virtual reality content, and/or other media) to subscribers of the media system, database service providers that provide a user interface to subscribers for managing databases maintained by the data service provider, docket management systems that provides a user interface to subscribers for interacting with and reviewing dockets maintained by the docket management system, security management systems that provide security management interfaces, systems that provide interfaces for augmented reality and/or virtual reality devices, Internet-of-Things (IoT) devices, networking devices, and/or other devices, any other type of interface that provides a client-view, among others.

FIG. 1 is a block diagram illustrating an example of a network environment 100. The network environment 100 includes a server system 101 and client devices 110a, 110b, through 110n. The server system 101 can include one or more server computers that can process user interface and/or other data to generate user interface data. The client device 110a, 110b, through 110n can include any suitable number of client devices that are connected (e.g., over a wired or wireless network) to the server system 101, such as one or more client devices. Further details of an example server system 201 and client device 210 are described below with respect to FIG. 2.

In some cases, the server system 101 can include a cloud infrastructure system (also referred to as a cloud network) that provides cloud services to the one or more client devices (e.g., client devices 110a-110n). In some cases, the server system 101 can include a system configured to provide software as a service (SaaS) or can be in communication with one or more servers provided SaaS services. In SaaS-based systems, a third-party provider can host applications and make them available to users over a network. For example, as shown in FIG. 1, the server system 101 can communicate (e.g., receive interface events 147 and send interface models 149, as described in more detail herein) with one or more server computers 140 over a network 136.

The server system 101 can have access to the user interface data specific to the application and/or website. The application and/or website can access services (e.g., cloud services, SaaS services, among others) provided by the server system 101 through a communications network (e.g., the Internet, a WiFi network, a cellular network, and/or using another other suitable communication network). In certain embodiments, the services provided by the server system 101 can include a host of services that are made available to users of the infrastructure of the server system on demand. Services provided by the server system 101 can dynamically scale to meet the needs of its users. The network of the server system 101 can comprise the one or more server computers and/or other devices and/or systems. In some cases, the one or more server computers and/or other devices and/or systems that make up the network are different from on-premises computers, server computers, and/or other devices and/or systems that may be located at a site (e.g., a user's home, a worksite, a site hosting an event, or other location). In some cases, one or more server computers and/or other devices and/or systems that make up the network of the server system 101 can be provided in an enterprise system. In some cases, a single entity (e.g., a cloud provider, a SaaS provider, or the like) can implement the server system 101, and the services can be provided by a different entity that has accounts (e.g., a cloud account, a SaaS account, or the like) with multiple users that access the services via client devices.

The one or more server computers of the server system 101 can be in communication with the one or more client devices 110a-110n using a network 134, such as a wireless network, a wired network, or a combination of a wired network and a wireless network. A wireless network can include any wireless interface or combination of wireless interfaces (e.g., the Internet, cellular such as 3G, Long-Term Evolution (LTE), or 5G, a combination thereof, and/or other suitable wireless network). A wired network may include any wired interface (e.g., fiber, ethernet, powerline ethernet, ethernet over coaxial cable, digital signal line (DSL), or other suitable wired network). The wired and/or wireless networks may be implemented using various routers, access points, bridges, gateways, or the like, that can connect the server system 101 and the client devices 110a-111n to the network.

The one or more client devices 110a-110n can include any device that can connect to a wired and/or wireless network, such as a set-top box, an Internet-connected television, a mobile device (e.g., cellular telephone, laptop or notebook computer, tablet computer, or other mobile device), a desktop computer, a wearable device (e.g., a smart watch, a fitness tracker, a virtual reality headset, an augmented reality headset, or other wearable device), a camera (e.g., a digital camera, an IP camera, a video camera, a camera phone, a video phone, or other suitable capture device), a digital media player, a video gaming console, a video streaming device, other media devices, and/or any other suitable type of device. In some cases, the one or more client devices 110a-110n can be configured to obtain or capture media data. The media data can include video, audio, images, any combination thereof, and/or any other type of media. The one or more client devices 110a-110n can include local interface generators 112a, 112b, through 111n and display devices 130a, 130b, through 130n. The display devices 130a, 130b, through 130n can display server-based user interfaces 132a, 132b, through 132n.

As noted above, a server-based user interface can be generated partly by the server system 101 and partly by a client device (e.g., one of the client devices 110a-110n) that will ultimately display the user interface or provide the user interface for display by another device. For example, an interface generator 102 of the server system 101 can receive interface events (e.g., one or more of interface events 107a, 107b, through 107n) from a local interface generator (e.g., one or more of local interface generator 112a, local interface generator 112b, through local interface generator 112n) of the client device (e.g., any one or more of the client device 110a, 110b, through 110n). For example, the interface events can be generated by the client device based on user input received through the user interface (e.g., an event specific to the application to which the user interface applies), based on system-level events (e.g., an event applying to the client device as a whole, such as a volume adjustment), and/or based on application-level events. The server system can identify an application and/or system (e.g., for system-level events) to which a received user interface event applies, and can determine graphical elements to display, where and how to display the different graphical elements, how to react to user interface events (e.g., determine any changes in the user interface for that application based on the received interface event), among other user interface actions. Upon receiving user interface information from the server system 101 (e.g., interface model 109a, interface model 109b, through interface model 109n, as described in more detail below), the client device can generate and render the user interface based on the user interface information. The user interface may be rendered in the application in which user interface events are identified.

In some implementations, a 'global' system object can be maintained by the server system 101 for different types of devices. The global system object for a device can be queried by applications to determine information for the device. The 'global' system object can provide information about the static and dynamic state of a device to the application. In some cases, some or all of the static and/or dynamic state information can be cached by the server system. The server system can send a request for information to the client device, and the client device can reply with the state information in response to the request. In some cases, some state information can be sent pro-actively to the server system as events (e.g., a Smart card has been removed, etc.). For differences in devices (e.g., screen size, device type, etc.), an application can generate different user interface properties (e.g., layouts among other attributes) based on device information (e.g., screen size, device type, etc.) coming from the 'global' system object.

In some examples, a server-based user interface can be generated partly by the server system 101 and partly by another server system (including one or more server computers). In some implementations, the other server system can include a SaaS system hosting one or more applications that are made available to one or more users. The other server system can provide a server-based user interface associated with an application to a client device for display by the client device or by another device (e.g., a display) in communication with the client device. For instance, as noted above and as shown in FIG. 1, the server system 101 can communicate with one or more server computers 140 over a network 136. For example, the interface generator 102 of the server system 101 can receive interface events (e.g., one or more of the interface events 147) from a local interface generator (not shown) of a server computer from the one or more server computers 140. The interface events are similar to those described above with respect to client devices 110a, 110b, through 110n. The server system can identify an application and/or system (e.g., for system-level events) to which a received user interface event applies, and can determine graphical elements to display, where and how to display the different graphical elements, how to react to user interface events (e.g., determine any changes in the user interface for that application based on the received interface event), among other user interface actions. The server system 101 can then provide user interface information to a server computer (from the one or more server computers 140), and the server computer can generate and render the user interface based on the user interface information (e.g., an interface model, as described in more detail below). While various examples are described herein that discuss communications between a server system (e.g., server system 101 and/or 201) and a client device (e.g., client device 110a, 110b, 110c, and/or 210), the same concepts apply to communications between multiple server systems (e.g., between server system 101 and one or more server computers 140).

In some examples, the server system 101 can generate an interface model describing how the user interface should look. As shown in FIG. 1, the server system 101 can generate and send an interface model 109a to the client device 110a, an interface model 109b to the client device 110b, through an interface model 109n to the client device 110n. For instance, an interface model can be generated based on received user interface events, such as one or more key presses, finger movements, device orientations and/or positions, among others. In some cases, an interface model can also be based on other events, such as other remote client events that may not be based on explicit user input or events received from a device or system other than a client device. Examples of other events can be based on a video being started or ending, video access control being denied, a phone ringing, an email or other message being received, among other events. In some cases, the server system can generate an interface model that logically defines one or more states of a user interface in a structural manner (e.g., states for one or more graphic objects of the user interface). In some implementations, the interface model can be defined, wholly or partially, by a structure or syntax, which can define or represent the logical structure of a document (e.g., a structure of a user interface of an application), and the way the document is accessed, generated, rendered, and/or manipulated. For example, an interface model may include a Document Object Model (DOM) that defines the structure for presenting components that comprise a user interface.

In some cases, the server system can improve the efficiency by which a user interface is generated and rendered at a client device. In at least one embodiment, the server system can optimize the interface model before sending the interface model to the client device. For example, the server system 101 can generate an intermediate interface model (also referred to herein as a "delta interface model") indicating the difference, or delta, between a current user interface (e.g., current state information for one or more graphic objects of the current user interface) determined by the server system 101 and a prior user interface (e.g., prior state information for one or more graphic objects of a previously-generated user interface). The server system can send a delta interface model to the client device indicating the difference only, instead of the entire interface model that describes the entire user interface.

The server system 101 can send the interface model, or a delta interface model with changes or differences from a previous interface model, to the client device. The client device can render the user interface based on the received interface model. In some cases, a graphics rendering engine in the local interface generator of the client device can read an interface model received for a user interface of a given application, and can render the interface defined by the interface model. For example, using the interface model, the graphics rendering engine can convert a tree of graphic objects from the interface model to a list of graphic routine calls. When a delta interface model is implemented, the client device can update the user interface based on the delta indicating the properties and/or functions of the user interface that have changed. In some cases, the interface model can indicate properties and/or functions of the user interface that can be reused if the user interface changes by a certain amount (e.g., a complete change in the user interface).

Figure 2:
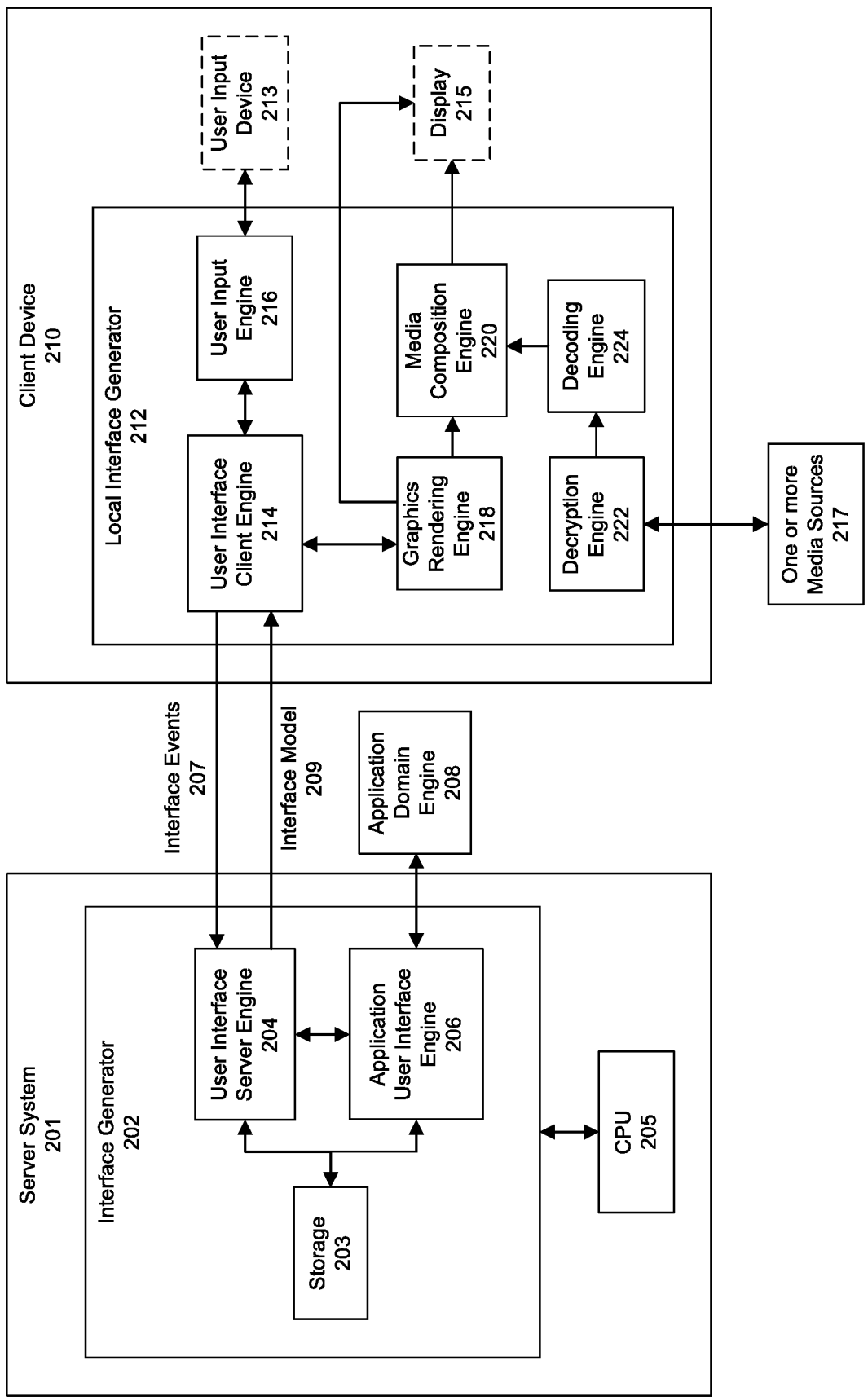
FIG. 2 is a block diagram illustrating an example of a server system and a client device, in accordance with some embodiments.

FIG. 2 is a diagram illustrating an example of a server system 201 in communication with a client device 210. The server system 101 includes various components, including a user interface server engine 204, an application user interface engine 206, storage 203, and a central processing unit (CPU) 205. The application user interface engine 206 is in communication with an application domain engine 208. The client device 210 also includes various components, including a user interface client engine 214, a user input engine 216, a graphics rendering engine 218, a media composition engine 220, a decryption engine 222, and a decoding engine 224. In some cases, the media composition engine 220, the decryption engine 222, and the decoding engine 224 are optional components that can be used only when needed. For example, some user interfaces do not include media, in which case the media composition engine 220, the decryption engine 222, and/or the decoding engine 224 may not be used. In some cases, as shown in FIG. 2, the output of the graphics rendering engine 218 can be provided directly to the display 215, such as when the user interface implemented by the graphics rendering engine 218 does not include any media. In some cases, a client device may not include a media composition engine 220, a decryption engine 222, and/or a decoding engine 224. In some implementations, depending on which type of device, the client device 210 may also include a user input device 213 and/or a display 215 (the optional nature of these components are illustrated by the dotted outline of the boxes representing these components). For example, a mobile device and a network-connected television can include a display, while a set-top box may not include a display.

The components of the server system 201 and the client device 210 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or can be implemented using computer software, firmware, or any combination thereof, to perform the various operations described herein. While the server system 201 and the client device 210 are shown to include certain components, one of ordinary skill will appreciate that the server system 201 and/or the client device 210 can include more or fewer components than those shown in FIG. 2. For example, the server system 201 and/or the client device 210 may also include, in some instances, one or more memory devices (e.g., RAM, ROM, cache, buffer, and/or the like), processing devices, one or more busses, and/or other devices that are not shown in FIG. 2.

The server system 201 is similar to and can perform the same or similar functions as the server system 101 of FIG. 1. Similarly, the client device 210 is similar to and can perform the same or similar functions as the client devices 110a-110n of FIG. 1. As described above with respect to FIG. 1, the server-based user interface can be generated by the system partly by the server system 201 and partly by the client device 210. The interface generator 202 of the server system 201 can perform the user interface logic. For example, the application user interface engine 206 of the interface generator 202 can determine what graphical elements to display, where and how to display the different graphical elements, functionality of the graphical elements, how user interface events are handled, among other user interface actions. It can be assumed that the client device 210 has enough graphics processing performance to display certain content, such as to display video and composite the video with some On-Screen Display (OSD). For example, the client device 210 can have at least a graphical processing unit (GPU) or other graphics software and/or hardware that can support graphics acceleration (e.g., two-dimensional or three-dimensional graphics acceleration). In some cases, the GPU or other graphics software and/or hardware can be part of the graphics rendering engine 218.

Figure 3:
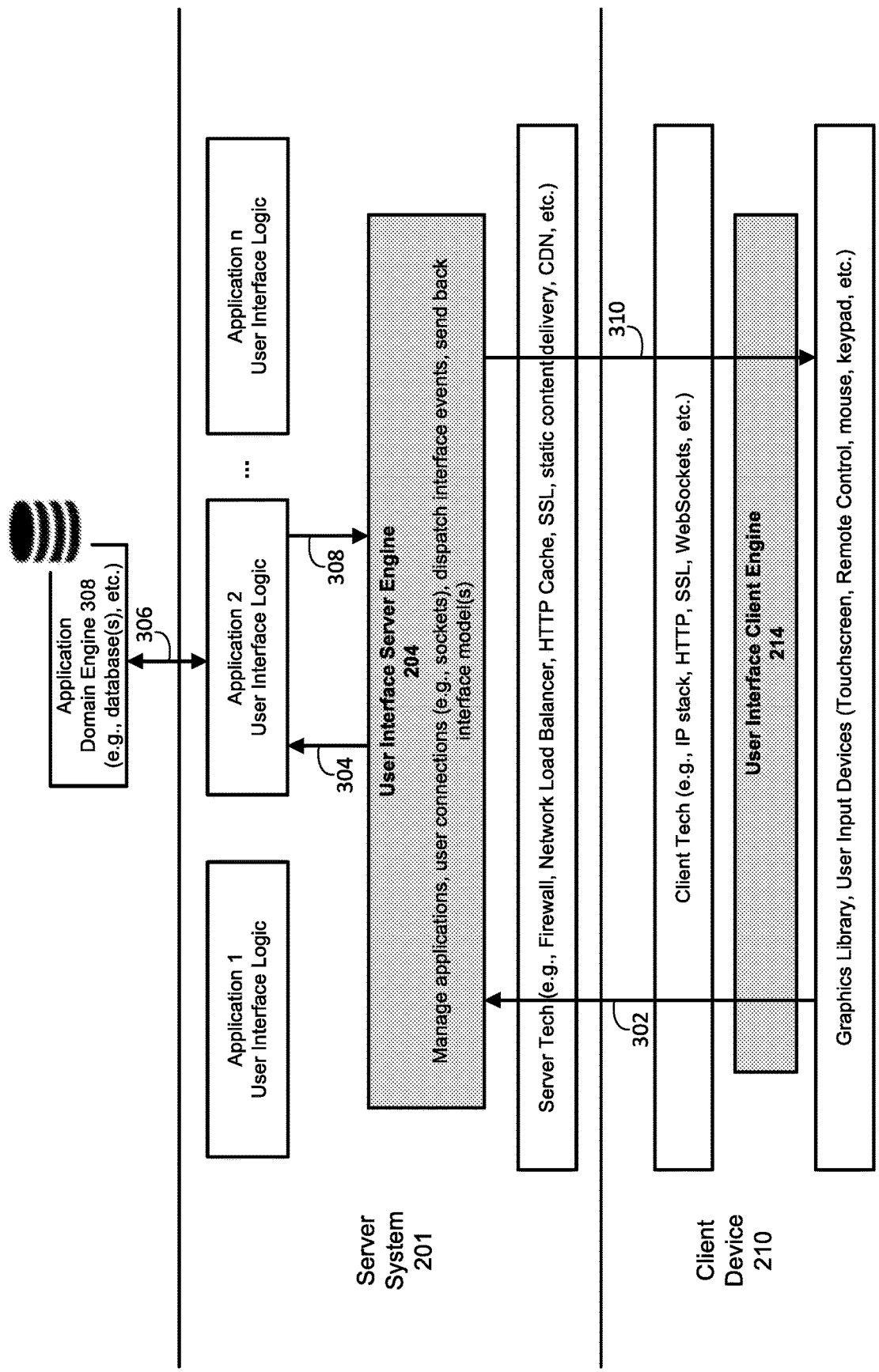
FIG. 3 is a diagram illustrating an example of a flow of messages between a server system and a client device, in accordance with some embodiments.

FIG. 3 is a diagram illustrating an example of a flow of messages between the server system 201 and the client device 210, and will be discussed along with FIG. 2. The client device 210 can generate interface events 207, which can be sent (e.g., at step 302 shown in FIG. 3) to the interface generator 202 of the server system 201 for processing. The interface events 207 can be associated with or include navigation commands (e.g., move a selection box from a first graphical element to a second graphical element, move to a different menu, among others), selection commands (e.g., select a graphical element corresponding to a move, display volume graphical element, among others), and/or any other suitable command. For instance, in some cases, interface events 207 can include low level event, such as control selection, input interactions, gesture commands, voice commands, orientation and/or position of the client device 210 or of the user input device 213, and/or other low level event that corresponds to one or more navigation commands, selection commands, and/or other commands.

The interface events 207 can be generated in response to input received from a user input device 213. The user input device 213 can be part of the client device 210, or can be a separate device that is in communication (wired and/or wirelessly) with the client device 210. The user input device 213 can include any suitable input device, such as a remote controller, a touchscreen, a microphone, a keypad, mouse, a keyboard, a device that can generate gesture inputs, a head-mounted display, and/or any other input device. A user can navigate a user interface and can select items presented by the user interface using the user input device 213. The user input engine 216 can receive input commands from the user input device 213. The user input engine 216 can include an input interface for receiving input commands. In some cases, different user input engines 216 can be included for different types of user input devices. In response to receiving input commands, the user input engine 216 can generate interface events 207, and can send the interface events 207 to the user interface client engine 214. In some cases, the user input engine 216 can send the input commands to the user interface client engine 214, and the user interface client engine 214 can generate the interface events 207.

In some cases, an interface event can be a system-level event. A system-level event is an interface event that relates to a system, such as the client device or another server system, instead of a particular application. A system-level interface event can be outed to a system-level application (e.g., a smart television application) even when one or more other applications are running for that user. One example of a system-level interface event can include a volume adjustment input provided through a remote control button. Another example of a system-level event can include color adjustment that effects the color of items displayed by the client device. Other illustrative examples of system-level events from a device include a phone being turned from a horizontal orientation to a vertical orientation and/or from a vertical orientation to a horizontal orientation, a Smart Card being removed, the device shutting down (e.g., powering off, going to sleep in a low power mode, or the like), the device having a low battery (e.g., the battery power being less than a battery power threshold, such as less than 10%, 20%, or other suitable power level), the device entering into a certain model (e.g., a night-time mode where the color of the interface changes, notifications or alerts are turned off, or the like), an application being paused by the user, an application being resumed by the user, among others. Illustrative examples of system-level events generated by the server and sent to the user interface client engine 214 can include a lost connection with a client device (and the user), the server shutting down, an application being paused, an application being resumed, among others.

In some cases, an interface event can be an application-level event. An application-level event is an interface event that relates to the application. For example, an application may generate an application-level event even when user input is not received. In various illustrative examples, an application-level event can include a change in a version of an application, a change in a display setting of an application, and/or any other application-level event.

A user interface server engine 204 of the server system 201 can receive the interface events 207 from the user interface client engine 214 of the client device 210. The user interface server engine 204 can then dispatch a message with one or more interface events for use by the suitable application (e.g., one of the applications out of application 1, application 2, through application n shown in FIG. 3) for the particular user of the client device 210. For example, at step 304 shown in FIG. 3, the user interface server engine 204 can send the one or more interface events to the application user interface engine 206. In some implementations, one interface event can be included in each message to the server system 201. In some implementations, multiple interface events can be included in each message to the server system 201. In some cases, interface events can be throttled or filtered so as to not overload the amount of messages to the server system 201. For example, in response to a user moving a finger on a touchscreen (e.g., of a smartphone), many events can be generated (e.g., 50 events per second). The events can be filtered to a certain number of interface events per time period (e.g., a maximum of six interface events per second).

The current session between the client device 210 and the application can be recognized using any suitable technique, such as using sockets, an identifier associated with a user and an application, among others. In some implementations, server system 201 can keep a socket open for each connected user, such as a first socket for a first user, a second socket for a second user, a third socket for a third user, and so on. In some case, multiple server computers can be used and a load-balancer can manage communications from client devices to the multiple server computers. The load-balancer can keep a "sticky-connection" between a particular server computer and a particular client device. For example, the server instance hosting a user's session with an application can be identified using an IP sticky connection, which ensures that requests from a single user are distributed to the server on which they started. The server system 101 can then keep an association between the opened socket and the current application and user.

For each user/connection, the user interface server engine 204 determines which application is the current one and which process is currently handling that application. In some cases, an application can register the events the application is interested in. In such cases, if a user has more than one application running for that user, the server system 101 can dispatch an event to the application that registered for that event. An application that is determined to apply to a user interface event can be referred to as an active application. In some cases, the server system 201 can have an application life cycle engine (not shown), which can filter and dispatch interface events to the active application for the given user and client device from which an event was received. As noted above, some events are system-level events (e.g., events that relate to a system instead of the application itself), and may not be outed (by default) to the active application.

As noted above, at step 304 shown in FIG. 3, the user interface server engine 204 can send the one or more interface events to the application user interface engine 206, which can interpret the one or more events. In some implementations, the user interface logic of the application user interface engine 206 can asynchronously request one or more domain functions from the application domain engine 208 (at step 306 of FIG. 3). In one illustrative example, a "pay phone bill" user interface of a service provider can be implemented by the server system 201, but the application user interface engine 206 can make a request to an application domain engine 208 (e.g., one or more servers and/or databases) of the service provider (e.g., using a URL of the service provider) to access user credentials, user credits, etc. In such cases, the server system 201 does not have to store all of the data (but can cache certain data in some cases, which can provide faster performance) associated with providers of the applications. In another example, a media streaming service application can be implemented by the server system 201. The streaming service user interface application may not itself maintain a list of movies to watch, but can request the list of movies from one or more servers and/or databases of the streaming service provider. In some cases, the application domain logic of the application domain engine 208 can be separated physically from the user interface logic of the application user interface engine 206, such as by running the domain logic as a separate service or micro-service (e.g., in a different subnetwork). For example, for a Chess game, the domain logic can handle the artificial intelligence (A.I.) of the game. In some cases, the application user interface logic of the application user interface engine 206 might bypass the domain logic (e.g., to increase speed). In some examples, the user interface logic can manage some form of caching. For example, an EPG application does not have to request to the EPG micro-service (e.g., in the application domain engine 208) to determine what is on a certain television channel a thousand times per second. Rather, the application user interface engine 206 can perform caching to temporarily maintain such data locally.

The application user interface engine 206 can interact with one or more applications stored in storage of the server system or in external storage. In the example shown in FIG. 3, the one or more applications can include application 1, application 2, through application n. In some cases, the application user interface engine 206 can include an application runtime engine (e.g., a sandbox) with application user interface logic. A sandbox can provide a secure environment. Each secure environment can be device-specific, application-specific, operating system (OS)-specific, or the like. In some implementations, each application can have a dedicated application user interface engine 206. In some cases, it can be more secure to run each application in its own application user interface engine 206. In some implementations, a single application user interface engine 206 can interact with multiple applications. In some cases, running different applications in a same application user interface engine 206 can use less resources. In some cases, multiple application user interface engines can be running concurrently. In some cases, applications with large usage can use multiple dedicated application user interface engines (e.g., when there is a limit per runtime engine). In some examples, applications from a common application developer or provider can share common application user interface engines. In some cases, certain application user interface logic could share processes. For example, an EPG application can share the same application user interface process as a television remote controller application, so as to easily share the cache of the two applications in RAM. In another example, niche applications with a small number of concurrent users can share process to save money.

During operation, an application user interface engine (e.g., a sandbox) can be launched, monitored, and shutdown as applications are added, removed, and/or updated, and as a user starts and/or stops the application. An application user interface process should be able to handle a certain number of users (e.g., a few thousand concurrent users). As the application process gets close to its limit of users, the user interface server engine 204 can launch an extra process for that application for the next number of users (e.g., for the next few thousand users). For example, a first user using an application can get an application user interface engine started, and then when too many users run that application in that application user interface engine, another application user interface engine can be started.

Based on one or more received interface events (e.g., one or more key presses, finger movements, device or input device orientations and/or positions, among others), the application user interface engine 206 can determine how the graphical elements (or graphic objects) of the user interface associated with the application should be displayed. For example, the application user interface engine 206 can determine various states for the user interface, such as the layout of graphic objects of the user interface, the color of the graphic objects, font, image information, video information, among other functions. Changes can include graphic changes, changes to controls and/or functions (e.g., adding or removing controls and/or functions), changes in the entire user interface, among others. The determination of whether a particular interface event (e.g., a touch input, key press, or the like) is a navigation command, a selection command, or other suitable command can be done at the application level by the application user interface engine 206. In some cases, determination of the various states of the user interface can be based on other remote client events that may or may not be based on user input, such as video being started or ending, video access control being denied, a phone ringing, among other events. For example, a graphical element including a video may be removed in response to a video ending. The available graphical elements and other user interface content for each application can be obtained from storage that is accessible to the server system 201 (e.g., storage 203 on the server system 201 or storage on one or more other local and/or remote servers). Using the available graphical elements and other user interface content, the application user interface engine 206 can determine what to be displayed, such as boxes, lines, text, images, address information (e.g., uniform resource locator (URL) or the like) such as for graphic assets, among other graphical content based on the received one or more interface events.

The application user interface engine 206 can determine which user interface graphic objects (or element) to display, remove, and/or change based on a particular interface event. For example, an application can register for certain events (e.g., key presses, scrolling events, zoom, play video, among others) so that a certain function will be called when a certain interface event occurs. In response to a received event and a corresponding function being called, the application user interface engine 206 can change the state of the application and can generate a new interface model defining the properties of the user interface according to the state change. Any suitable framework can be used to implement application changes based on received interface events. One illustrative example of a framework implemented by the server system 201 is shown in Table 1 below.

| UI Application | UI system | Client Device or Server System |
|---|---|---|
| | | Key pressed |
| | <<event | |
| | Find right handler, right application/user context | |
| "Event handler" | <<Event | |
| | >>Action | |
| | | Dispatch action |
| | <<Previous State, Action | |
| "Reducer" update state | | |
| | >>Return new State | |
| | | if state changed |
| | <<State | |
| "Renderer" Convert state to DOM | | |
| | >>new DOM | |
| | | Compute delta new Dom, vs previous DOM |
| | >>delta DOM | |
| | | DOM = DOM + delta Graphic update |

Using the framework in Table 1, based on an interface event, the UI application can generate a DOM or update a DOM when it receives the interface event, and the DOM or delta DOM can be sent to a client device or server system. The names "event handler," "reducer," and "renderer" used in Table 1 are standard in UI frameworks (e.g., a React framework). In one illustrative example, the framework shown in Table 1 below can be for a UI Cloud application. The client device can include client device 210, the server system in the right-most column of Table 1 can include the one or more server computers 140, the UI system corresponds to the user interface server engine 204, and the UI application corresponds to the application user interface engine 206.

Figure 8:
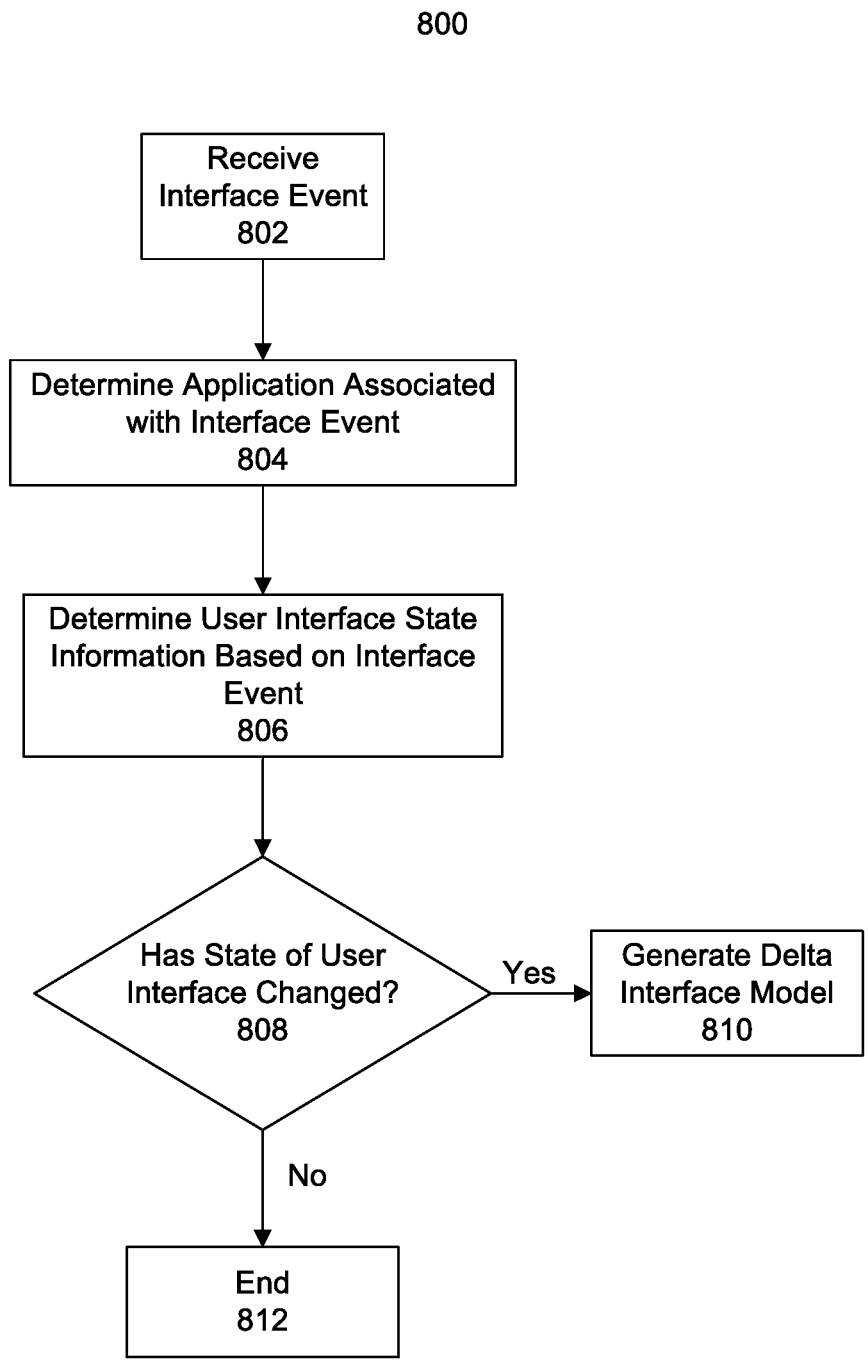
FIG. 8 is a flowchart illustrating an example of a process of generating a delta interface model, in accordance with some embodiments.

FIG. 8 is a flowchart illustrating an example of a process 800 for generating a delta interface model. The process 800 will be described along with the framework shown in Table 1. At block 802, the process 800 includes receiving an interface event. For example, referring to the framework in Table 1, the client device or server system can receive an input corresponding to an interface event. The client device or server system can send the interface event to the UI system. At block 804, the process 800 can determine an application associated with the interface event. For example, referring to table 1, the UI system can find the correct event handler and the correct application/user context (including information associated with the user). A different event handler can be maintained by an application for each interface event for which that application is registered. For example, a first event handler can be maintained for a first interface event (e.g., keypress, a mouse movement, a touch event on a touchscreen, among others), a second event handler can be maintained for a second interface event, a third event handler can be maintained for a third interface event, and so on. An event handler can be a function of an application, where the function is called when an interface event corresponding to that event handler occurs (e.g., a keypress-related event handler function is called when a keypress event is received by the server system). The event handler can generate an action based on the event. The UI system can dispatch or implement the action. Dispatching of the action can cause the user interface to be updated based on the action, which can cause a state change in the user interface. For example, the UI system can send the previous state and the action to the UI application, and the UI application can implement a reducer to update the state. The reducer returns the new state (based on the action) to the UI system.

At block 806, the process 800 can determine user interface state information based on the interface event. At block 808, the process 800 can determine whether the state of the user interface has changed. If the state of the user interface is determined to have changed at block 808, the process generates a delta interface model at block 810. If the state of the user interface is determined not to have changed at block 808, the process 800 can end at block 81. Referring to table 1, a renderer is called when the state of the user interface is changed. For example, if the state is changed as compared to the previous state of the user interface, the state is sent to the renderer of the UI application to convert the state to a new interface model (e.g., a Document Object Model (DOM), as described below, or other interface model). The new DOM is then sent to the UI system. In implementations in which a delta DOM is used, the UI system computes a delta DOM based on the difference between a prior user interface and the current user interface. The UI system can send the delta DOM to the client device or server system. In cases in which a delta DOM is not used, the UI system can send the full DOM to the client device or server system. The client device or server system can update the user interface (e.g., perform a graphic update for the user interface) based on the DOM or delta DOM.

In some cases, the user interface logic of the application user interface engine 206 can request user interface changes at any time, not only when there is a reception of a client event. In some cases, when a single event is received (e.g., a key press), an application may request more than one user interface change (e.g., two or more changes). For example, a first graphic change can be implemented by the application domain engine 208 when the event is received (allowing quick feedback to the viewer), and a second graphic change can be implemented as the domain logic of the application domain engine 208 answers a request for information from the application user interface engine 206. In some cases, the application user interface engine 206 can update the the user interface from time to time, such as to push new information, after a timeout, and/or in response to other occurrences.

The application user interface engine 206 can generate an interface model describing state information for the user interface. For example, when the application user interface engine 206 is ready to answer a request from the user interface server engine 204, the application user interface engine 206 can generate a new or revised interface model that describes the layout and other features of objects of the user interface. The application user interface engine 206 can then pass the interface model back to the user interface server engine 204 (at step 308 of FIG. 3).

In some implementations, as noted above, the interface model can include a Document Object Model (DOM). A DOM can define or represent the logical structure of a document (e.g., a structure of a user interface of an application), and the way the document is accessed and manipulated. For instance, a DOM can include a tree of objects, with each object having properties (e.g., color, position, size, among other properties). In some cases, a DOM can define or represent the logical structure and accessibility and manipulation information of a Hypertext Markup Language (HTML) document (e.g., for a web page or web application), an Extensible Markup Language (XML) document, an Extensible Hypertext Markup Language (XHTML) document, and/or other document. A DOM is a cross-platform and language-independent application programming interface that treats a document as a tree structure, with each node including an object representing a part of the document. One or more objects can represent an element of a user interface, the element of which may be interactive causing the generation of interface events. For example, a DOM generated for defining a user interface can include a tree of graphic objects (e.g., one or more boxes, lines, images, icons, text, videos, among other graphic objects) with attributes (e.g., one or more positions, colors, URLs, among others). Using a DOM, the application user interface engine 206 can navigate the structure of a document, and can add, modify, and/or delete elements and content from the document (e.g., based on received user interface events and/or other events, such as remote client events). For instance, using the DOM, many items of the document can be accessed, changed, deleted, and/or added based on received user interface events. In some implementations, an interface model (e.g., a DOM) can be defined based on the device, operating system (OS) type, versions of applications, and/or some other varying feature of a client. For example, an interface model can be generated that has differences in user interfaces between device types, OS types, versions of applications, etc. In such implementations, a single interface model or a delta interface model (including UI changes) can be defined for multiple clients by device, application, OS, etc. In some cases, different interface models may be generated based on the varying device features or a single model may be used for all different features.

In some cases, the server system 201 can automatically optimize the interface model (e.g., the DOM) before sending the interface model to the client device 210. For example, the user interface server engine 204 can compress the interface model (e.g., the DOM) as much as possible before sending the interface model to the client device 210. Compression of an interface model can include generating a delta interface model by determining a difference between a current interface model (defining a current user interface) determined by the application user interface engine 206 and a prior user interface model (defining a prior user interface). In some cases, the interface model can be further compressed by applying one or more standard compression algorithms (e.g., performing zip compression to put the DOM in a .zip file format).

As noted above, in some cases, the application user interface engine 206 can generate a new interface model (e.g., a DOM), and the user interface server engine 204 can determine the differences (the "delta") between the new interface model and a previous interface model based on received interface events. Having the user interface server engine 204 determine the delta interface model can generally be simpler for the application (e.g., for a given state, the application has a given look). In some cases, the application user interface engine 206 can generate the delta interface model. For example, some applications may prefer to have the application user interface engine 206 manage the delta (e.g., where the application would indicate what is new and what is different).

In some cases, the user interface server engine 204 can send an interface model 209 (e.g., DOM) to the user interface client engine 214 of the client device 210 (at step 310 of FIG. 3). In some cases, the user interface server engine 204 can send a delta interface model (e.g., a delta DOM) to the user interface client engine 214 indicating only the changes or differences of a current user interface from a previously-generated user interface (e.g., the last user interface generated before the current user interface), instead of the entire interface model that describes the entire user interface. In some implementations, the interface model (e.g., DOM) or delta interface model (e.g., delta DOM) can be sent as an object in a certain format, such as a JavaScript Object Notation (JSON) object in a text-based format for representing structured data, or other suitable object. In some cases using a DOM as an example of an interface model, a delta DOM can include the structure of the entire DOM, but only leaves (or nodes) of the DOM that include changed graphical elements can include data. The leaves of the DOM that include no changes can be left empty (with no data) in the delta DOM. As described further below, the client device client code (of the user interface client engine 214) can optimize the portion of the screen to redraw based on the received delta DOM. In some examples, a full interface model (e.g., a full DOM) can always be sent when changes to the interface model are generated. In some examples, a full interface model can be sent only when a user navigates from one application to another application and/or in other situations (e.g., when an application is first launched, among others). In some examples, a delta interface model can be sent when the application changes its interface model (e.g., based on processing by the application user interface engine 206).

In some examples, an interface model (e.g., a DOM) or a delta interface model can be compressed by reusing certain properties that are shared across graphical elements of a user interface (e.g., menu items). For instance, to simplify the rendering of a user interface by a client device, the server system 201 can use constant 'styles' that could be reusable without 'rules'. For example, different menu items may share multiple properties or certain properties may differ by a small amount (e.g., the caption and x-coordinate position for menu items are different, while color, font, size, height, width, etc. are the same, or menu items may only be different when highlighted, etc.). In such examples, the server system 201 can be designed so that it does not use cascaded style sheets (CSS), which in some cases can be very demanding on compute resources (e.g., CPU). CSS is a mechanism for adding style (e.g., fonts, colors, spacing, etc.) to user interfaces or other electronic media (e.g., web documents, etc.). The constant styles implemented by the server system 201 can be performed using an "HTML" class syntax.

Using a DOM as an example of an interface model, a full DOM can be referred to as an Intra-DOM (I-DOM or iframe), and a delta DOM can be referred to as a Predictive-DOM (P-DOM or pframe). An example of an I-DOM (intra) corresponding to a PoC main menu (uncompressed) is as follows:

```
["iframe", { "styles":{"backgroundColor":"#e4e4e4"},
"photo1":{"styles":{"top":"1%","left":"20%","width":"60%","height":"10%","transition":"all 1.00s","borderWidth":"1px","onclick":"yes","onmouseenter":"yes","backgroundColor":"white","borderStyle":"solid","boxShadow":"grey     10px     5px
5px","borderColor":"gray"},"label0":{"styles":{"left" :"10%","top":"20%","text":"My 1st Application"}}},
"photo2":{"styles":{"top":"12%","left":"20%","width":"60%","height":"10%","transition":"al
l
1.00s","borderWidth":"1px","onclick":"yes","onmouseenter":"yes","backgroundColor":"#e4e4e4","borderStyle":"hidden","boxShadow":"none","borderColor":"gray"},"label1":{"styles":
{"left":"10%","top":"20%","text":"Photo carousel 1"}}},
"photo3":{"styles":{"top":"23%","left":"20%","width":"60%","height":"10%","transition":"al
l
1.00s","borderWidth":"1px","onclick":"yes","onmouseenter":"yes","backgroundColor":"#e4e4e4","borderStyle":"hidden","boxShadow":"none","borderColor":"gray"},"label2":{"styles":
{"left":"10%","top":"20%","text":"Photo animated"}}},
"pong":{"styles":{"top":"34%","left":"20%","width":"60%","height":"10%","transition":"all 1.00s","borderWidth":"1px","onclick":"yes","onmouseenter":"yes","backgroundColor":"#e4e4e4","borderStyle":"hidden","boxShadow":"none","borderColor":"gray"},"label3":{"styles":
{"left":"10%","top":"20%","text":"Pong"}}},
"connect4":{"styles":{"top":"45%","left":"20%","width":"60%","height":"10%","transition":"all
1.00s","borderWidth":"1px","onclick":"yes","onmouseenter":"yes","backgroundColor":"#e4e4e4","borderStyle":"hidden","boxShadow":"none","borderColor":"gray"},"label4":{"styles":
{"left":"10%","top":"20%","text":"Connect Four"}}},
  "tele":{"styles":{"top":"56%","left":"20%","width":"60%","height":"10%","transition":"all 1.00s","borderWidth":"1px","onclick":"yes","onmouseenter":"yes","backgroundColor":#e4e4e4","borderStyle":"hidden","boxShadow":"none","borderColor":"gray"},"label5":{"styles":
{left":"10%","top":"20%","text":"Program Guide"}}},
"radio":{"styles":{"top":"67%","left":"20%","width":"60%","height":"10%","transition":"all 1.00s","borderWidth":"1px","onclick":"yes","onmouseenter":"yes","backgroundColor":"#e4e4e4","borderStyle":"hidden","boxShadow":"none","borderColor":"gray"},"label6":{"styles":
{"left":"10%","top":"20%","text":"Radios"}}},
"clock2":{"styles":{"top":"78%","left":"20%","width":"60%","height":"10%","transition":"al
l
1.00s","borderWidth":"1px","onclick":"yes","onmouseenter":"yes","backgroundColor":"#e4e4e4","borderStyle":"hidden","boxShadow":"none","borderColor":"gray"},"label7":{"styles":
{"left":"10%","top":"20%","text":"Clock2"}}},
"abra":{"styles":{"top":"89%","left":"20%","width":"60%","height":"10%","transition":"all 1.00s","borderWidth":"1px","onclick":"yes","onmouseenter":"yes","backgroundColor":"#e4e4e4","borderStyle":"hidden","boxShadow":"none","borderColor":"gray"},"label8":{"styles":
{"left":"10%","top":"20%","text":"Zapper"}}}}
]
```

An example of a P-DOM (inter) that is generated as user a goes down one item (e.g., an input event corresponding to an arrow key down) is as follows:

```
["pframe", {
"photo1":{"styles":{"backgroundColor":"#e4e4e4","borderStyle":
"hidden","boxShadow":"none"}},
    "photo2":{"styles":{"backgroundColor":"white","borderStyle":"solid",
"boxShadow":"grey 10px 5px 5px"}}}
]
```

As shown by the P-DOM ("pframe") above, only two menu items are listed (i.e., the menu items that change), with only the changing properties. In that case, there are no added or deleted objects, only property changes. The property changes in the example P-DOM above include the background colors, the border styles, and the box shadow color of the "photo1" and the "photo2." If an object was added in a current user interface model, the object would just be added in the delta DOM. If an object from a previous user interface model was deleted in a current user interface model, the object can be tagged as 'deleted' in the delta DOM for the current user interface model.

Another example of a P-DOM corresponding to a list of movies scrolling up is below. As an <DOWN-ARROW> keypress is processed, the top-most movie in the list disappears, and another movie at the bottom is added to the list. For the "movie0-12785" object, it is tagged as "deleted" to be removed from the client screen. Further, the "boxShadow" is also deleted from "movie0-40418." Another option would be to have the "boxShadow" set to "none". In the below example, The movies "movie0-53986" and "movie0-30877" just move vertically, and only the "top" property of these movies is refreshed. The properties of the two movies "movie0-40418" and "movie0-37828" change more drastically as they get or lose focus, therefore receiving more changes.

```
{
"moviesContainer": {
  "movie0-12785": "deleted",
  "movie0-40418": {
    "styles": {
      "left": "2%",
      "width": "96%",
      "borderStyle": "none",
      "borderWidth": "1px",
      "zIndex": "0",
      "backgroundColor": "rgb(135, 197, 214)",
      "fontSize": "6vh",
      "top": "-20%",
      "boxShadow": "deleted"
    }
  },
  "movie0-37828": {
    "styles": {
      "left": "0%",
      "width": "99vw",
      "borderStyle": "solid",
      "borderWidth": "0.25vw",
      "zIndex": "1",
      "backgroundColor": "21a8ce",
      "fontSize": "8vh",
      "top": "0%",
      "boxShadow": "1vh 1vh rgba(0, 0, 0, 0.5)"
    }
  },
  "movie0-53986": {
    "styles": {
      "top": "20%"
    }
  },
  "movie0-30877": {
    "styles": {
      "top": "40%"
    }
  },
Etc.
```

In some implementations, the server system 201 can manage two or more interface models (e.g., two or more DOMs). For example, the server system 201 can manage a system DOM for a global system application and an application DOM for an application. In such an example, the global system application can control the client device (e.g., an operator application in the case of PayTV), while the user can mainly interact with the application. In another example, an application (e.g., a messaging, email, or alert application) can be displayed on top of a current application (e.g., an EPG, a gaming application, or other application). For instance, the application can be displayed as a popup over the current application. The popup application can provide an option to jump to a full screen related application (e.g., the popup application can indicate that an email has been received, along with an option to jump directly to the full email application). In such an example, the server system 201 can manages multiple interface models for multiple applications in parallel even when only one application is visible to the user. Managing multiple interface models allows fast switching from one application user interface to another application user interface.

As noted above, the user interface server engine 204 of the server system 201 can send an interface model 209 (e.g., DOM), or a portion thereof with changes or differences from a previous interface model (e.g., a delta interface model, such as a delta DOM), to the user interface client engine 214 of the local interface generator 212 of the client device 210 (at step 310 of FIG. 3). The graphics rendering engine of the client device can render the user interface based on the received interface model or delta interface model. Use of an object model (e.g., a DOM) can enable the client device to avoid processing to determine state information for the user interface (e.g., a layout or changes in a layout, among other features of the user interface), such as performing layout computation. For example, the application user interface engine 206 can pre-compute the graphical element properties (e.g., the graphical element positions, sizes, colors, and/or other properties), which are represented by the interface model or delta interface model (e.g., DOM or delta DOM), so that there no need for the client device 210 to perform a layout computation and/or other processing required to determine the user interface properties. Instead, the client device can implement routines (e.g., graphics routines) to generate the user interface based on the DOM or the changes in the DOM. The client device 210 can read an object model or delta interface model received for a given user interface, and can render the user interface defined by the object model or delta interface model. For example, using a DOM or delta DOM, the graphics rendering engine 218 of the client device 210 can convert a tree of graphic objects from the DOM or delta DOM to a list of graphics routine calls. Based on the interface properties (e.g., state information) described in the object model or delta interface model, the graphics rendering engine 218 can generate draw commands. In some cases, when a delta DOM is received by the client device 210, the graphics rendering engine 218 can optimize the portion of the screen to redraw based on the received delta DOM. Receiving the delta DOM can simplify the decision by the client device 210 of which part of the screen should be redrawn. In some cases, the graphic rendering engine 218 knows nothing of the interface events, and can perform a graphic automation based on the DOM or delta DOM. The graphic rendering engine 218 can perform animation in some examples. For instance, properties sent in the DOM can be used to describe the animation. In one illustrative example, the graphic rendering engine 218 can perform transition-only animations, where an application can provide new properties to a DOM object associated with a time it would take to do the transition. A transition-only animation (or 'transition' animation) is one of the animation type with CSS3/HTML. For example, instead of just instantly changing a property (e.g., a top-left position of an object), it can expressed in the application that the change is to happen according to a temporal parameter (e.g., the change is to happen in 'n' seconds). The temporal parameter can be expressed by setting a 'transition=time" property to the object.

In some cases, an object model or delta object model (e.g. DOM or delta DOM) can be layered by the server system 201 or can be sent to the client device 210 without being layered by the server system 201. Layering is the action of finding where to display objects in a user interface. Many positioning decisions need to be made when performing layering. For example, interface objects (e.g., graphic objects or elements) have properties or attributes that indicate characteristics such as a first object being on the right of a second object, a third object being below a fourth object, among others. Layer can lead to many computations when changing properties, as positions of objects depend on each other. In one example, the 'y' position of a first object can depend on the size of the font of a second object that is positioned near the first object. In some examples, object properties that have side effects on neighboring objects can be prohibited, which can be sufficient for user interfaces designed for full screen applications (e.g., user interfaces for phones, tablets, televisions, media devices such as set-top boxes or other console devices, etc.). In some examples, the layering can be performed by the server system 201 to generate a layered interface model (e.g., a layered DOM), and the layered interface model can be sent to the client device 210. In some cases, a layering plugin can be implemented between the user interface application and the user interface server system that would take care of layering the objects without changing the rest of the system.

The client device 210 can also receive media content (e.g., video, audio, graphics, images, a combination thereof, or other media) (also referred to herein as "media") from one or more media sources 217. Because the client device 210 performs the rendering of the UI that supports presentation of the media content, the server system 201 may not need access to the one or more media sources 217, which can reduce the processing burden on the server system 201. The local interface generator 212 of the client device 210 can integrate the media content from the one or more media sources 217 into the rendered graphics. For example, the decryption engine 222 can decrypt media (and/or any other media) when the received media is encrypted. For example, the decoding engine 224 can decode video using any suitable coding technique based on the format in which the video is received (e.g., H.265/high efficiency video coding (HEVC), H.264/advanced video coding (AVC), MPEG, or other video format). The media composition engine 220 can combine the rendered user interface from the graphics rendering engine 218 and the decrypted and/or decoded media from the decoding engine 224. The combined data can then be sent to the display 215. As noted previously, the display 215 can be part of the client device 210 in some implementations. For example, the client device 210 can be a mobile device, and the display 215 can be the display screen of the mobile device. In another example, the client device 210 can be a network-connected television (e.g., a television having a WiFi modem and transceiver), and the display 215 can be the display screen of the television. In some implementations, the display 215 can be separate from the client device 210. For example, the client device 210 can be a set-top box, and the display 215 can be part of a television connected to the set-top box.

The server-based user interface described above is a significant enhancement that, compared to existing solutions with graphics rendering, video compression, video coding, etc., would save a large amount of server compute (e.g., CPU, RAM, cache, etc.) resources (e.g., at a ratio of 1/50). For example, in video-based systems, the server system 201 does not need to process the video (e.g., compress/encode, etc.) and send the video to the client device 210. Furthermore, the amount of bandwidth for communication between the server system 201 and the client device 210 can be minimized based on communication of the interface model for rendering a user interface, instead of a generated user interface, elements of the user interface, or both, which may include media content. Another advantage is that the start-up speed of applications would be greatly enhanced using the server-based system described herein. For example, when a user starts an application on a client device, the application can load in real-time because the application is already up and running on the server system 201. To illustrate, the applications on the server system 201 (e.g., an electronic program guide (EPG) or other application) would be shared amongst many concurrent client devices and their users. As a client device starts an application that is not yet running on the server system 201, the application is loaded by the server system 201 and can be added to a list of applications running on the server system 201. For example, the server system 201 can determine that an application is triggered by a client device when the client device starts the application. The server system 201 can determine the application is not running on the server system 201, and in response to determining the application is not running on the server system 201, the server system 201 can add the application to the list of applications running on the server system 201. The list of applications can be accessible by a plurality of client devices using the server computer. For example, when a new client device (and new user of the client device) begins interacting with an application, the application (e.g., the EPG) can already be up and running by the server system 201 for other client devices and users to access, so there is no startup time to load the application or to load the application data (e.g., the EPG data) for the new client device and user. In an application user interface engine 206 (e.g., a sandbox), an application shares common data (e.g., an EPG database could be fully in the RAM) for all users, while it has only little need for the user context (e.g., one or more states, such as current DOM and connection). In existing solutions where the application runtime engine is on the client device, a starting application would have to be loaded and initialized, which adds delay.

Another benefit of the server-based user interface described herein is related to security. For instance, a side effect of the server-based user interface is that the information that is sent to client devices by the server system (e.g., server system 201) is information related to graphics-related information (e.g., state information for one or more graphic objects of a user interface), in which case there is no form of an application programming interface (API) being exposed. Such a solution thus provides a secure way of implementing user interfaces. This is a benefit over existing server-based solutions, where a client device makes calls (e.g., send a request), via an API, to a server to obtain content (e.g., a movie, search results, among other information), leaving data in such API calls open for security breaches (e.g., an unauthorized third party may access a key, sensitive data, and/or other information included in an API call).

Figure 4:
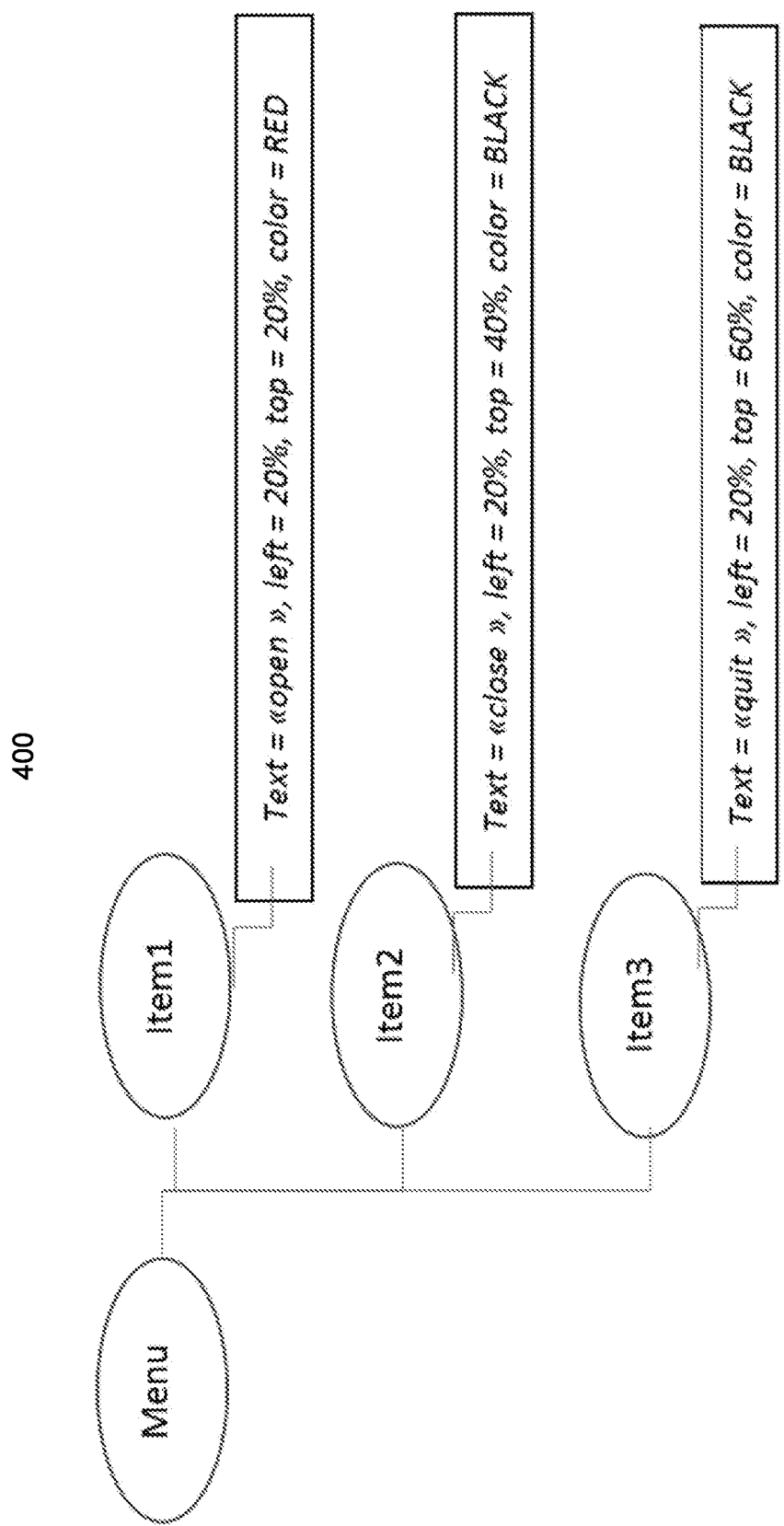
FIG. 4 is a diagram illustrating an example of an interface model, in accordance with some embodiments.
Figure 5:
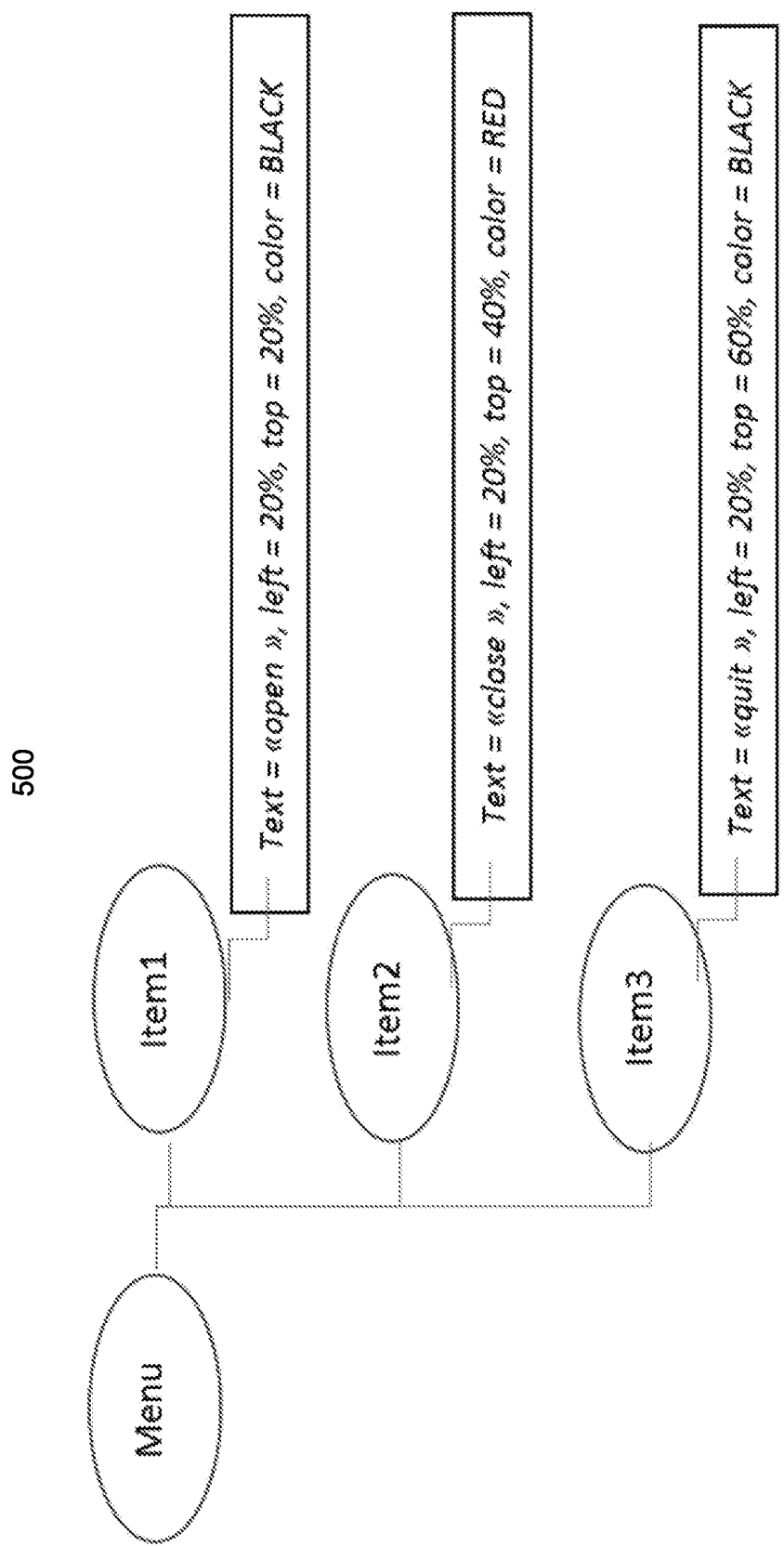
FIG. 5 is a diagram illustrating another example of an interface model, in accordance with some embodiments.

FIG. 4 is a diagram illustrating an example of a Document Object Model (DOM) 400 defining state information of a user interface with three menu items, labeled as Item1, Item2, and Item3. The three menu items include textual graphical elements. FIG. 5 is a diagram illustrating an example of a DOM 500 defining different state information for the user interface based on a received event. For example, the application user interface engine 206 can generate the DOM 400 for the user interface with the first menu item (for Item1) highlighted in red text, and the other two menu items (for Item2 and Item3) in black text. In response to an input event (e.g., in response to an <ARROW DOWN> keypress), the application user interface engine 206 can generate the new DOM 500 with the second menu item (for Item2) highlighted in red text, and the other two menu (for Item1 and Item3) items in black text.

Figure 6:
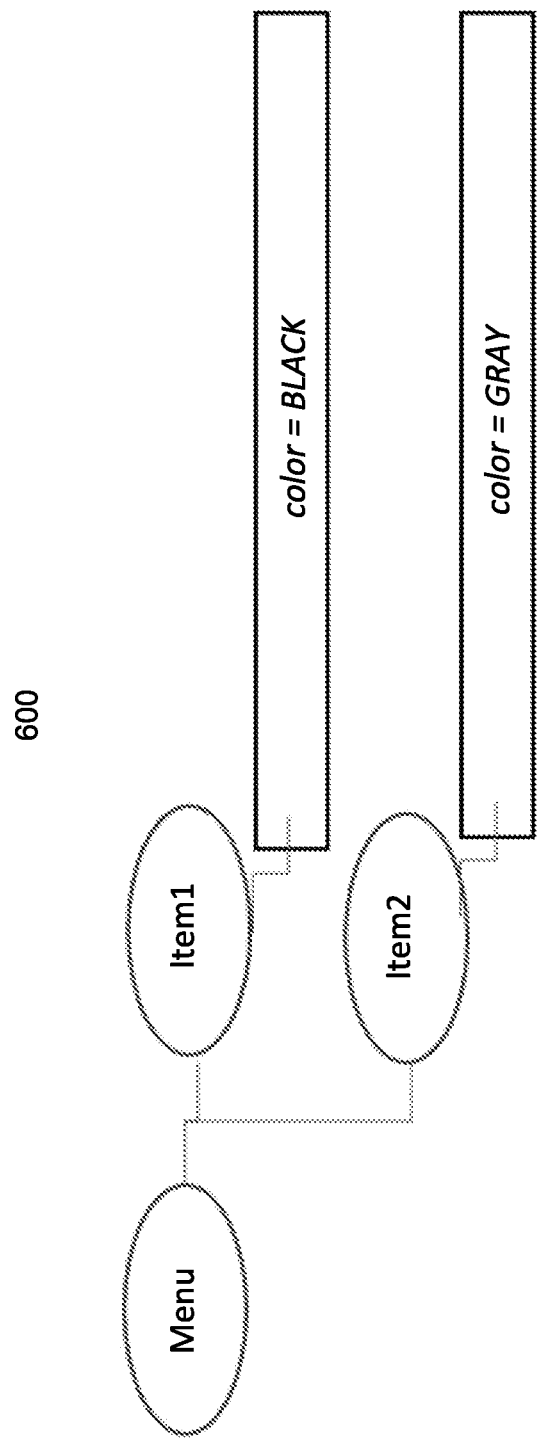
FIG. 6 is a diagram illustrating an example of a delta interface model, in accordance with some embodiments.
Figure 7:
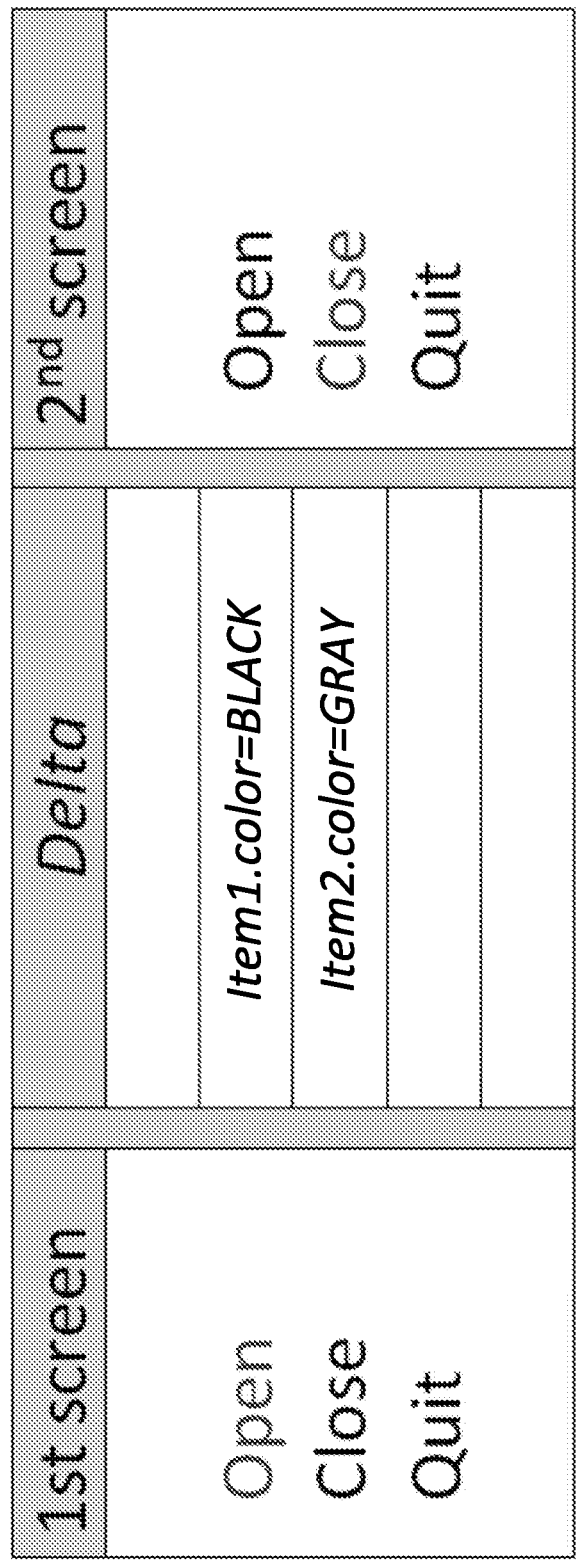
FIG. 7 is a diagram illustrating an example of a change in a user interface based on a delta interface model, in accordance with some embodiments.

In the example of FIG. 4 and FIG. 5, the only changes between the DOM 400 and the DOM 500 are the color properties of the first and second items. FIG. 6 is an example of a delta DOM 600 that includes only the difference between the DOM 400 and the DOM 500. For example, the delta DOM 600 only includes an indication that the color of item1 has changed to black, and an indication that the color of item2 has changed to gray. FIG. 7 is a diagram illustrating an example of a change in a user interface based on a delta DOM 600. For instance, based on the delta DOM 600 shown in FIG. 6 indicating that the item1 menu item has changed from gray to black, the "Open" menu item (corresponding to "item1" in FIG. 6) changes from a gray color in a first screen of the user interface to a black color in a second screen of the user interface. Further, based on the delta DOM 600 indicating that the item2 menu item has changed from black to gray, the "Close" menu item (corresponding to "item2" in FIG. 6) changes from a black color in the first screen of the user interface to a gray color in the second screen of the user interface. The delta DOM 600 can be sent to the client device 210 to update the graphics of the user interface. In such cases, objects that do not change may not be sent to the client device 210. For objects that change, only changed properties are sent.

In some examples, because the server-based system described herein (e.g., server system 101 and/or server system 201) maintains and manages the user interfaces of one or more applications, remote client control of a user interface of an application displayed by a client device can be performed efficiently, making it possible for the server-based system or an additional client device to take control of the client device (e.g., in a remote desktop situation). For instance, because an application can already be up and running on the server system 201, a computer of the server system 201 can display the same content of the application that is displayed by a client device receiving an interface model (or delta interface model) from the server system 201 for that application. In some cases, the remote client control can enable replay of the content to enable discovery of problems in presentation and/or to provide detection of issues. In another example, a first client device can remotely control a user interface of an application displayed by a second client device. For instance, the same interface model or delta interface model (e.g., DOM or delta DOM) can be sent to the first device and to the second device. Performing client control or remote desktop operations in such an example is made easier using the server-based system described herein, as the user interface of an application is rendered by the server system and can be sent by the server system to both the first client device and the second client device. In some cases, the first client device and the second client device can both provide input for an instance of an application to the server system, and the server system can modify the user interface based on the input from both the first and second client devices. In such cases, users of the first and second client devices can collaboratively interact with the same user interface of the application instance.

In some cases, when certain client devices are used (e.g., a desktop computer with a mouse or other input device, a mobile phone, tablet computer, wearable device, or other device with a touchscreen, gesture-based, and/or other interface, among others), a large number of input events can be sent from the client devices to the server system (e.g., server system 201). In one illustrative example, 100 events per second can be generated when a mouse is moved from one point to another. Touch events on a touchscreen can also generate a large number of events. Such a large number of events can be too burdensome for the server system from a resource perspective (e.g., bandwidth, computing, memory, etc.). For instance, the number of raw events can quickly become too large for transmission and processing by the server system in real-time.

In some examples, the events from a client device can be throttled. For instance, a new way of handling certain types of input (e.g., swipes and/or other gestures that include repeated movement of an input) is provided herein. For instance, swipes or other gestures or input on client devices (e.g., on mobile phones, tablet computers, among others) can be used to scroll a list of items. As a user swipes fast on a touchscreen, using a mouse, etc., some form of auto-repeat occurs to cause the items to continue scrolling, after which the menu items begin to gradually slow down. The user will then need to swipe again and again to scroll through a long list, leading to generation of many input events. The input events (e.g., swipe-based events, and/or other gesture-based events) can be throttled by detecting that the user has kept a finger, pointing device, mouse, or other input tool in place at the end of an input (e.g., at the end of a swipe movement), and continuing a scrolling operation until the input is released. In one illustrative example, the server system can detect that a user has kept a finger, pointing device, or other input tool on a touch interface at the end of a swipe movement (e.g., the user swipes a finger and holds the finger in place at the end of the swipe). In response to detecting the user has kept the input tool (e.g., finger, etc.) in place at the end of the swipe movement, the server system will cause the scroll to continue in the same direction until the user removes their finger. In some cases, the server system can detect a speed of the input, and can perform a continuous scroll operation based on the speed (e.g., a faster scroll can be performed in response to a faster input). Such a solution for throttling inputs reduces the number of input events that are generated, and allows the user to perform less input gestures to scroll a list of items.

In some cases, with respect to keyboard events, a client device can send key down (a keyboard button is pushed down) and key up (a keyboard button is released) events. For keyboard events, all the event handling is performed by the server system (e.g., server system 201). In such cases, autorepeat management can be implemented, where repeated up events are not sent to the server system. In some cases, a server system may provide (e.g., send or transmit) more updates to the client than what the client or network can handle. In some examples, such as to make sure the server system does not provide too many repeat updates, the client device can send a message to the server indicating the client is ready (referred to as a "ready message") when the client determines it is ready to accept more repeat updates. The server system can wait to send updates to the client device until it receives a ready message from the client device. In some examples, the client device can provide (e.g., send or transmit) a message to the server system instructing the server system to pause or stop sending updates. The message can be referred to as a "pause x message," where "x" can be a delay indicator for how long the server system is to wait before providing further updates to the client device. In some cases, the client device can send the pause x message when the client gets more updates that it can handle (e.g., a number of updates exceeds a threshold number of updates, such as 10 updates, 50 updates, or other suitable number, or other threshold indicating the client device has received too many updates).

In some examples, input event (e.g., mouse event, touch event, among others) handlers can be implemented. For instance, in HTML and/or JavaScript (JS), one can declaratively associate a function to handle an event. An illustrative example is as follows:

<button onclick="javascript function here( )">Click Me</button>

A difficulty is that the interface model (e.g., a DOM) is sent to and processed by a client device, while the functions are performed by a server computer of the server system (e.g., server system 201). An input event handler can be used by the server system (e.g., server system 201) to translate function references (e.g., an HTML and/or JS function reference) to unique function identifiers (IDs). For example, a first function can be mapped or associated with a first function ID, a second function can be mapped or associated with a second function ID, a third function can be mapped or associated with a third function ID, and so on. The server side can send the function IDs to a client device. In response to an event detected based on a user input, an application-level event, or a system-level event, the client device can associate a function to the event, locate the ID associated with that function, and send the ID to the server system. The server system 201 can then call the function and perform the function to determine how the user interface will be modified. In some examples, a client device can send a list of N function-ID couples or pairs (e.g., including a target object, function ID) that an event generated. The server system can call the N functions, passing information about the event (e.g., to the application user interface engine 206 and/or the application domain engine 208). By using such an input event handler, the server system can perform functions without requiring an application user interface to change the way it operates (e.g., the application can continue to declaratively associate a function to hand a particular event).

In some examples, the server system (e.g., the server system 201) can maintain a remote system object per connection with a client device. For example, a remote system object can include data represented as an instantiation of a data object structure storing information about the system, including connection information. The remote system object can persist such that multiple applications can rely on an existing connection for efficiency and speed, such as for communication of client events across different applications. A remote system object per connection can be shared by some or all applications running for a client device and/or user of the client device. An effect of maintaining a remote system object per connection is that it creates a multi-tasked system from the perspective of the client device. A user can switch back and forth from a first application to a second application (e.g., from a game to an EPG) and can resume in the second application where the application was when the user previously switched from the second application.

In some implementations, the server system (e.g., the server system 201) can adapt to the capabilities of different client devices. For example, a filter can be added to an interface model (e.g., to a user interface tree of a DOM or delta DOM) defining certain restrictions that are placed on what can be included in the interface model for a particular client device. In one illustrative example, if a client has a known limitation on processing of certain pixel dimensions or positions, such as being able to render and display resolutions of high definition or lower resolution video pictures, a filter or restriction can be placed on the interface model for that client device indicating that a maximum video resolution of 1280×720 pixels (or other high definition resolution) can be displayed by the client device.

FIG. 9 is a flowchart illustrating an example of a process 900 of generating user interface content using the techniques described herein. At block 902, the process 900 includes receiving (e.g., by a server computer or other device) a user interface event. In cases when the process 1000 is performed by a server computer, the server computer can be part of the server system 101 or the server system 201. The user interface event corresponds to a user interface of a client device. For example, the user interface event can be based on user input received by the user interface. In another example, the user interface event can be a system-based event that is related to the user interface. The client device can include any suitable device. In some examples, the client device includes a media device. The user interface can include any type of user interface, such as a graphical user interface, a media content guide (e.g., an electronic program guide (EPG)), an interface of a gaming application, an interface of a mobile application, an interface of a smart television application, or any other suitable user interface.

At block 904, the process 900 includes determining an application associated with the user interface event. For example, the application associated with the user interface event can be determined based on a connection between the server computer (or other device) and the client device. The connection can include a socket or any other suitable connection.

At block 906, the process 900 includes generating an interface model using the application associated with the user interface event. The interface model defines state information for one or more graphic objects of the user interface. The state information results from the user interface event. In some cases, the process 900 can include determining the state information based on at least the user interface event. In some examples, the generated interface model can include a portion of a larger interface model. For example, generating the interface model includes generating a portion of the interface model. The portion of the interface model is associated with a portion of the user interface. For instance, the portion of the interface model can define state information for a subset of the user interface (e.g., for one page or a portion of one page of the user interface).

In some examples, the process 900 can include compressing the interface model. In such examples, the compressed interface model is sent to the client device. In some cases, the interface model can be considered as a first interface model. Compressing the interface model can be performed by determining a difference between the state information for the one or more graphic objects and previous state information for the one or more graphic objects, and by generating a second interface model including only data for the one or more graphic objects having state information that is different from the previous state information. The second interface model can also be referred to as a delta interface model.

In some examples, the interface model can include a hierarchical data structure having the one or more graphic objects. For instance, the interface model and the delta interface model can include a document object model (DOM). Each graphic object of the one or more graphic objects can have one or more attributes defined by the state information. In some cases, the one or more graphic objects include at least one of a box, a line, an image, an icon, text, a content item to be displayed in the user interface, or any combination thereof. Each graphic object of the one or more graphic objects can include one or more attributes defined by the state information. The one or more attributes of the one or more graphic objects can include at least one of a position, a shape, a color of a graphic object, any combination thereof, and/or other suitable attribute.

At block 908, the process 900 includes sending (e.g., by the server computer or other device), the interface model (or the second interface model) to the client device. In some cases, the interface model can be sent to an additional server computer (e.g., the one or more server computers 140 or another device other than a server computer). The interface model enables the client device (or the additional server computer or other device) to render the user interface.

In some examples, the process 900 can include determining an application is triggered by the client device, and determining the application is not running on the server computer. The process 900 can include adding the application to a list of applications accessible by a plurality of client devices using the server computer. For example, in response to determining the application is not running on the server computer, the process 900 can add the application to the list of applications accessible by the plurality of client devices using the server computer. As described above, when a new client device begins interacting with an application in the list of applications, the application can already be up and running by the server system so that there is no startup time for the client device to load the application or to load the application data.

Figure 10:
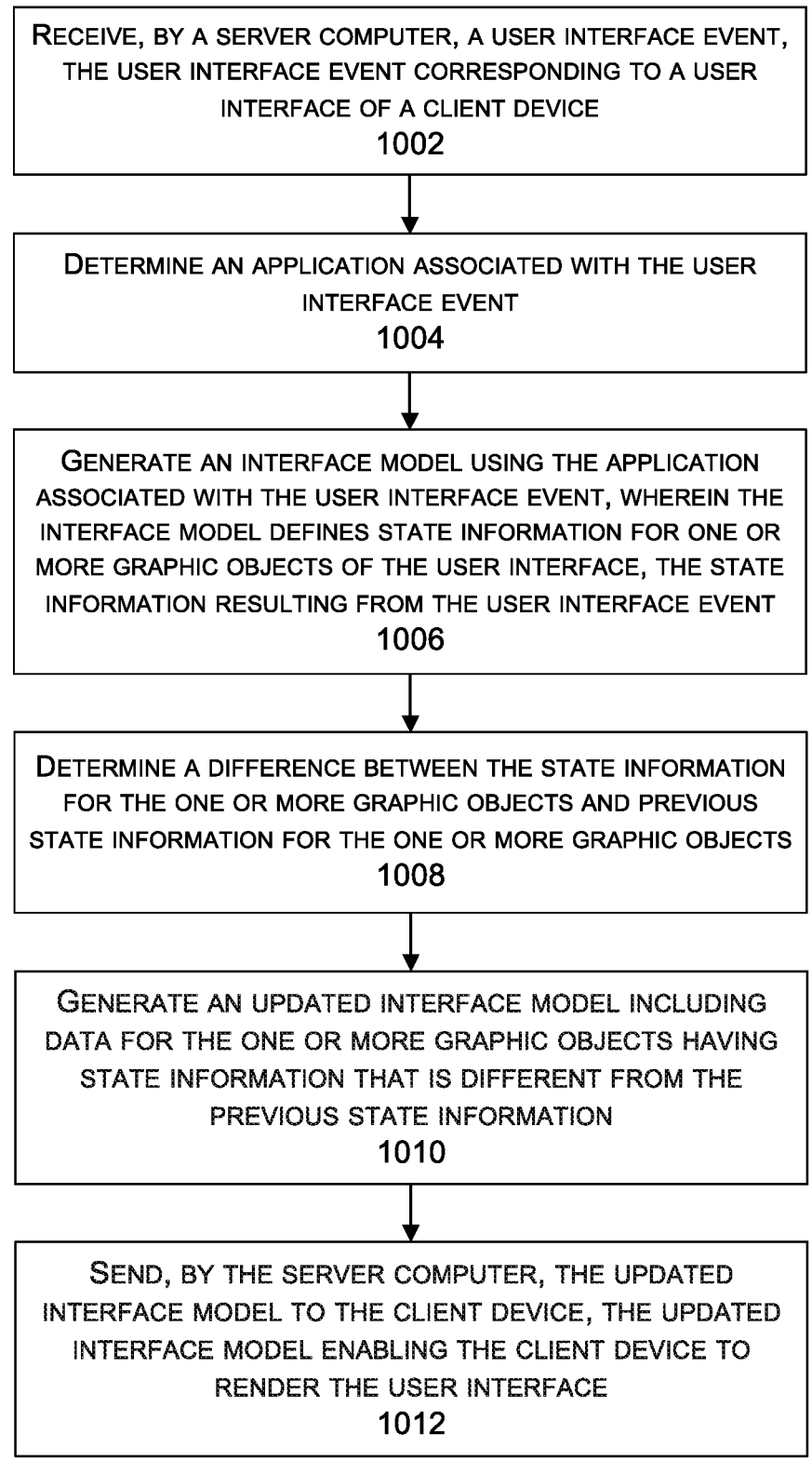
FIG. 10 is a flowchart illustrating another example of a process of processing user interface content, in accordance with some embodiments.

FIG. 10 is a flowchart illustrating an example of a process 1000 of generating user interface content using the techniques described herein. At block 1002, the process 1000 includes receiving (e.g., by a server computer or other device) a user interface event. In cases when the process 1000 is performed by a server computer, the server computer can be part of the server system 101 or the server system 201. The user interface event corresponds to a user interface of a client device. For example, the user interface event can be based on user input received by the user interface. In another example, the user interface event can be a system-based event that is related to the user interface. The client device can include any suitable device. In some examples, the client device includes a media device. The user interface can include any type of user interface, such as a graphical user interface, a media content guide (e.g., an electronic program guide (EPG)), an interface of a gaming application, an interface of a mobile application, an interface of a smart television application, or any other suitable user interface.

At block 1004, the process 1000 includes determining an application associated with the user interface event. For example, the application associated with the user interface event can be determined based on a connection between the server computer (or other device) and the client device. The connection can include a socket or any other suitable connection.

At block 1006, the process 1000 includes generating an interface model using the application associated with the user interface event. The interface model defines state information for one or more graphic objects of the user interface. The state information results from the user interface event. In some cases, the process 1000 can determining the state information based on at least the user interface event.

At block 1008, the process 1000 includes determining a difference between the state information for the one or more graphic objects and previous state information for the one or more graphic objects. At block 1010, the process 1000 includes generating an updated interface model including data for the one or more graphic objects having state information that is different from the previous state information. For example, the updated interface model can include only data for the one or more graphic objects having state information that is different from the previous state information (in which case data for other graphic objects that have state information that is not different from the previous state information will not be included in the updated interface model). The updated interface model can also be referred to as a delta interface model or a second model (or second interface model).

In some examples, the interface model can include a hierarchical data structure having the one or more graphic objects. For instance, the interface model and the delta interface model can include a document object model (DOM). Each graphic object of the one or more graphic objects can have one or more attributes defined by the state information. In some cases, the one or more graphic objects include at least one of a box, a line, an image, an icon, text, a content item to be displayed in the user interface, or any combination thereof. Each graphic object of the one or more graphic objects can include one or more attributes defined by the state information. The one or more attributes of the one or more graphic objects can include at least one of a position, a shape, a color of a graphic object, any combination thereof, and/or other suitable attribute.

At block 1012, the process 1000 includes sending (e.g., by the server computer or other device), the updated interface model to the client device. In some cases, the updated interface model can be sent to an additional server computer (e.g., the one or more server computers 140 or another device other than a server computer). The updated interface model enables the client device (or the additional server computer or other device) to render the user interface.

In some examples, the processes 800, 900, and 1000 may be performed by a computing device or an apparatus. For example, the processes 800, 900, and 1000 may be performed by the server system 201 shown in FIG. 2 (e.g., a server computer or multiple server computers of the server system 201). In some cases, the computing device or apparatus may include various components, such as one or more input devices, one or more processors, one or more microprocessors, one or more microcomputers, one or more output devices, and/or other component of a computing device (e.g., a server computer or other device) that is configured to carry out the steps of the processes 800, 900, 1000, and/or other process described herein. The computing device may include a memory configured to store data (e.g., an interface model, a delta interface model, graphical elements and other user interface content for one or more applications, and/or any other suitable data) and one or more processors configured to process the data. The computing device may also include one or more network interfaces configured to communicate data. The network interface may be configured to communicate network based data (e.g., Internet Protocol (IP) based data or other suitable network data). The computing device can also include a display in some implementations.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

Processes 800, 900, and 1000 are illustrated as a flowchart or logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 800, 900, and 1000 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 11:
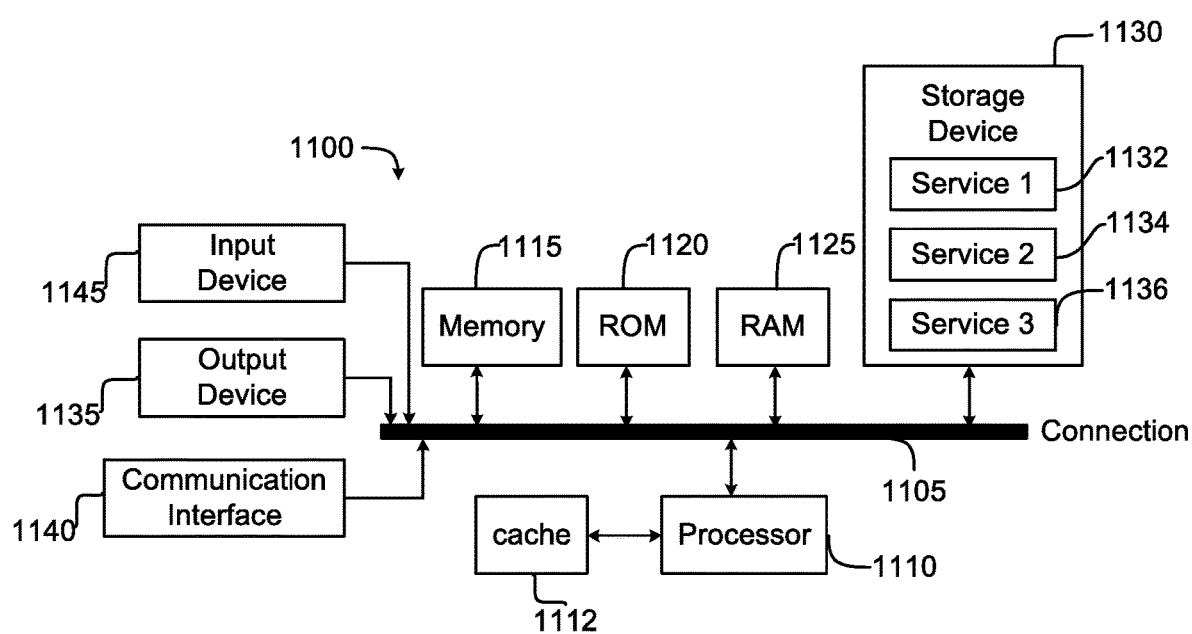
FIG. 11 is a block diagram illustrating an example of a computing system architecture, in accordance with some embodiments.

FIG. 11 illustrates an architecture of a computing system 1100 wherein the components of the system 1100 are in electrical communication with each other using a system connection 1105, such as a bus. The example system 1100 includes a processing unit (CPU or processor) 1110 and a system connection 1105 that couples various system components including the system memory 1115, such as read only memory (ROM) 1120 and random access memory (RAM) 1125, to the processor 1110. The system 1100 can include a cache of high-speed memory connected directly with, in close proximity to, or integrated as part of the processor 1110. The system 1100 can copy data from the memory 1115 and/or the storage device 1130 to the cache 1112 for quick access by the processor 1110. In this way, the cache can provide a performance boost that avoids processor 1110 delays while waiting for data. These and other modules can control or be configured to control the processor 1110 to perform various actions. Other system memory 1115 may be available for use as well. The memory 1115 can include multiple different types of memory with different performance characteristics. The processor 1110 can include any general purpose processor and a hardware or software service, such as service 1 1132, service 2 1134, and service 3 1136 stored in storage device 1130, configured to control the processor 1110 as well as a special-purpose processor where software instructions are incorporated into the actual processor design. The processor 1110 may be a completely self-contained computing system, containing multiple cores or processors, a bus, memory controller, cache, etc. A multi-core processor may be symmetric or asymmetric.

To enable user interaction with the system 1100, an input device 1145 can represent any number of input mechanisms, such as a microphone for speech, a touch-sensitive screen for gesture or graphical input, keyboard, mouse, motion input, speech and so forth. An output device 1135 can also be one or more of a number of output mechanisms known to those of skill in the art. In some instances, multimodal systems can enable a user to provide multiple types of input to communicate with the system 1100. The communications interface 1140 can generally govern and manage the user input and system output. There is no restriction on operating on any particular hardware arrangement and therefore the basic features here may easily be substituted for improved hardware or firmware arrangements as they are developed.

Storage device 1130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1125, read only memory (ROM) 1120, and hybrids thereof.

The storage device 1130 can include services 1132, 1134, 1136 for controlling the processor 1110. Other hardware or software modules are contemplated. The storage device 1130 can be connected to the system connection 1105. In one aspect, a hardware module that performs a particular function can include the software component stored in a computer-readable medium in connection with the necessary hardware components, such as the processor 1110, connection 1105, output device 1135, and so forth, to carryout the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

Devices implementing methods or processes according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

What is claimed is:

1. A method of processing user interface content, the method comprising:
receiving, by a server computer, a first user interface event, the first user interface event corresponding to a user interface of a client device;
determining an application associated with the first user interface event;
generating a first document object model (DOM) using the application associated with the first user interface event, wherein the first DOM defines first state information used to render one or more graphic objects of the user interface, the first state information resulting from the first user interface event;
sending, by the server computer, the first DOM to the client device, the first DOM enabling the client device to render the user interface;
receiving, by the server computer, a second user interface event;
generating second state information based on the second user interface event;
determining a difference between the first state information and the second state information;
generating a second DOM that represents the difference between the first state information and the second state information based on the determination; and
sending, by the server computer, the second DOM to the client device.

2. The method of claim 1, wherein the first DOM includes a hierarchical data structure having the one or more graphic objects, a graphic object of the one or more graphic objects having one or more attributes defined by the first state information.

3. The method of claim 1, wherein the one or more graphic objects include at least one of a box, a line, an image, an icon, text, and a content item to be displayed in the user interface.

4. The method of claim 1, wherein one or more attributes of the one or more graphic objects include at least one of a position, a shape, and a color of the one or more graphic objects.

5. The method of claim 1, further comprising:
determining the first state information based on at least the first user interface event.

6. The method of claim 1, further comprising:
compressing the second DOM.

7. The method of claim 1, wherein the application associated with the first user interface event is determined based at least on a connection between the server computer and the client device.

8. The method of claim 1, wherein the client device includes a media device, and wherein the user interface includes a media content guide.

9. The method of claim 1, wherein generating the second DOM includes generating a changed portion of the first DOM, the changed portion of the first DOM being associated with a portion of the user interface.

10. The method of claim 1, further comprising:
determining an application is triggered by the client device;
determining the application is not running on the server computer; and
adding the application to a list of applications accessible by a plurality of client devices using the server computer.

11. A system comprising:
one or more processors; and
a memory accessible to the one or more processors and storing instructions which, upon execution by the one or more processors, cause the one or more processors to perform operations to:
receive a first user interface event, the first user interface event corresponding to a user interface of a client device;
determine an application associated with the first user interface event;
generate a first document object model (DOM) using the application associated with the first user interface event, wherein the first DOM defines first state information used to render one or more graphic objects of the user interface, the first state information resulting from the first user interface event;
send the first DOM to the client device, the first DOM enabling the client device to render the user interface;
receive a second user interface event;
generating second state information based on the second user interface event;
determine a difference between the first state information and the second state information;
generate a second DOM that represents the difference between the first state information and the second state information based on the determination; and
send the second DOM to the client device, the second DOM enabling the client device to render the user interface.

12. The system of claim 11, wherein the first DOM includes a hierarchical data structure having the one or more graphic objects, each graphic object of the one or more graphic objects having one or more attributes defined by the first state information.

13. The system of claim 11, wherein the one or more graphic objects include at least one of a box, a line, an image, an icon, text, and a content item to be displayed in the user interface.

14. The system of claim 11, wherein each graphic object of the one or more graphic objects includes one or more attributes that include at least one of a position, a shape, and a color of a graphic object.

15. The system of claim 11, the memory storing instructions which, upon execution by the one or more processors, cause the one or more processors to:
determine the first state information based on at least the first user interface event.

16. The system of claim 11, the memory storing instructions which, upon execution by the one or more processors, cause the one or more processors to:
compress the second DOM.

17. The system of claim 11, wherein the application associated with the first user interface event is determined based at least on a connection with the client device.

18. The system of claim 11, wherein the client device includes a media device, and wherein the user interface includes a media content guide.

19. The system of claim 11, wherein generating the second DOM includes generating a changed portion of the first DOM, the changed portion of the first DOM being associated with a portion of the user interface.

20. A non-transitory computer-readable medium having stored thereon instructions that, when executed by one or more processors, cause the one or more processors to:
- receive a first user interface event, the first user interface event corresponding to a user interface of a client device;
- determine an application associated with the first user interface event;
- generate a first document object model (DOM) using the application associated with the first user interface event, wherein the first DOM defines first state information used to render one or more graphic objects of the user interface, the first state information resulting from the first user interface event;
- send the first DOM to the client device, the first DOM enabling the client device to render the user interface;
- receive a second user interface event;
- generating second state information based on the second user interface event;
- determine a difference between the first state information and the second state information;
- generate a second DOM that represents the difference between the first state information and the second state information based on the determination; and
- send the second DOM to the client device.

21. The non-transitory computer-readable medium of claim 20, wherein the application associated with the first user interface event is determined based at least on a connection with the client device.

22. The non-transitory computer-readable medium of claim 20, wherein generating the second DOM includes generating a changed portion of the first DOM, the changed portion of the first DOM being associated with a portion of the user interface.

* * * * *